United States Patent
Johnson et al.

(10) Patent No.: US 9,484,745 B2
(45) Date of Patent: Nov. 1, 2016

(54) VIRTUAL OSCILLATOR CONTROL OF POWER ELECTRONICS INVERTERS

(71) Applicant: THE BOARD OF TRUSTEES OF THE UNIVERSITY OF ILLINOIS, Urbana, IL (US)

(72) Inventors: Brian Johnson, Denver, CO (US); Sairaj Dholpe, Minneapolis, MN (US); Abdullah Hamadeh, Cambridge, MA (US); Philip Krein, Champaign, IL (US)

(73) Assignees: RUTGERS, THE STATE UNIVERSITY OF NEW JERSEY, New Brunswick, NJ (US); THE BOARD OF TRUSTEES OF THE UNIVERSITY OF ILLINOIS, Chicago, IL (US)

( * ) Notice: Subject to any disclaimer, the term of this patent is extended or adjusted under 35 U.S.C. 154(b) by 201 days.

(21) Appl. No.: 14/450,972

(22) Filed: Aug. 4, 2014

(65) Prior Publication Data
US 2015/0070948 A1    Mar. 12, 2015

Related U.S. Application Data

(60) Provisional application No. 61/875,518, filed on Sep. 9, 2013.

(51) Int. Cl.
| | |
|---|---|
| H02J 3/38 | (2006.01) |
| H02M 7/525 | (2006.01) |
| H02M 1/00 | (2006.01) |
| H02M 7/493 | (2007.01) |

(52) U.S. Cl.
CPC ............ *H02J 3/38* (2013.01); *H02M 7/493* (2013.01); *H02M 7/525* (2013.01); *H02M 2001/0012* (2013.01)

(58) Field of Classification Search
CPC .. H02M 7/49; H02M 7/493; H02M 7/53871; H02M 7/525; H02M 2001/0012; H02M 7/53873; H02M 7/5395
See application file for complete search history.

(56) References Cited

U.S. PATENT DOCUMENTS

| | | | | |
|---|---|---|---|---|
| 5,140,670 A | * | 8/1992 | Chua ................... | G06N 3/0635 706/20 |
| 6,127,899 A | * | 10/2000 | Silva ..................... | H03B 29/00 331/117 FE |
| 6,167,359 A | * | 12/2000 | Demir ................ | G01R 31/2824 375/226 |
| 2006/0006741 A1 | * | 1/2006 | Tassitino, Jr. ........... | H02J 9/062 307/82 |
| 2006/0171182 A1 | | 8/2006 | Siri et al. | |

(Continued)

FOREIGN PATENT DOCUMENTS

GB    2446432    8/2008

OTHER PUBLICATIONS

Skjellnes et al., "Load sharing for parallel inverters without communication", Aug. 2002, Nordic Workshop on Power and Industrial Electronics, pp. 12-14.*

(Continued)

*Primary Examiner* — Jue Zhang
*Assistant Examiner* — Lakaisha Jackson
(74) *Attorney, Agent, or Firm* — Klintworth & Rozenblat IP LLC

(57) ABSTRACT

A system includes power electronics inverters connected in a network. The power electronics inverters can utilize measurements at local terminals, without a need to exchange information between other power electronics inverters.

20 Claims, 29 Drawing Sheets

(56) References Cited

U.S. PATENT DOCUMENTS

| | | | |
|---|---|---|---|
| 2008/0205096 A1 | 8/2008 | Lai et al. | |
| 2009/0147554 A1* | 6/2009 | Adest | G01S 3/7861 363/71 |
| 2010/0248647 A1* | 9/2010 | Wachi | H03L 7/099 455/73 |
| 2011/0229743 A1* | 9/2011 | Hsu | C25B 1/02 429/7 |
| 2012/0205986 A1* | 8/2012 | Frampton | H02J 3/381 307/84 |
| 2014/0077890 A1* | 3/2014 | Babaie | H03B 1/00 331/117 R |

OTHER PUBLICATIONS

Johnson et al., "Synchronization of Nonlinear Oscillators in an LTI Electrical Power Network," 9 pages.

Johnson et al., "Oscillator-Based Inverter Control for Islanded Three-Phase Microgrids," 9 pages.

Johnson et al., "Synchronization of Parallel Single-Phase Inverters with Virtual Oscillator Control," IEEE Transactions on Power Electronics (Accepted Dec. 2013), 14 pages.

Torres et al., "Power Supply Synchronization without Communication," 6 pages—http://www.ece.ucsb.edu/~hespanha/published/PES_sync.pdf.

Johnson et al., "Synchronization of Nonlinear Oscillators in an LTI Electrical Power Network," IEEE Trans. Circuits Syst. I: Fundam. Theory Appl., 2013, in review, 9 pages.

Johnson et al., "Oscillator-Based Inverter Control for Islanded Three-Phase Microgrids," IEEE Journ. Photovoltaics, 2013., in review, 9 pages.

Johnson et al., "Synchronization of Parallel Single-Phase Inverters with Virtual Oscillator Control," IEEE Transactions on Power Electronics (Accepted Dec. 2013), to be submitted, 14 pages.

Torres et al., "Power Supply Synchronization without Communication," Proc. of the Power and Energy Society General Meeting, Jul. 2012, 6 pages—http://www.ece.ucsb.edu/~hespanha/published/PES_sync.pdf.

* cited by examiner

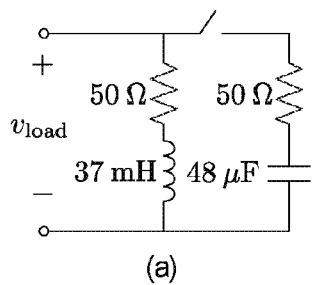 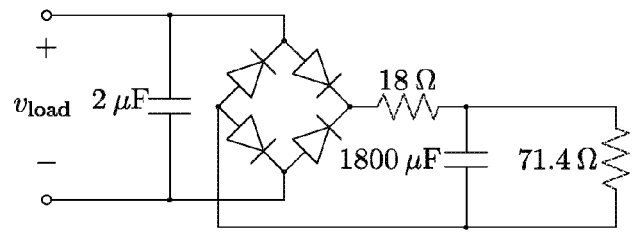
Figure 24A                Figure 24B
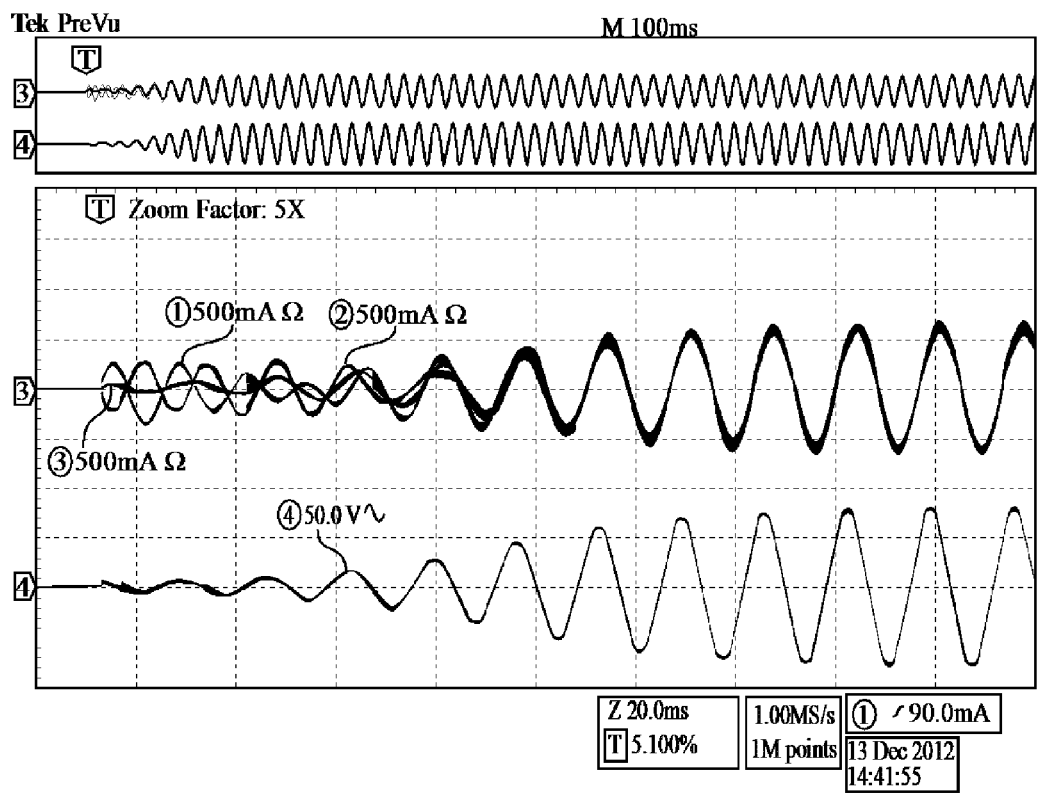
Figure 25

VIRTUAL OSCILLATOR CONTROL OF POWER ELECTRONICS INVERTERS

CROSS-REFERENCE TO RELATED APPLICATIONS

This application claims the benefit of U.S. Provisional Application Ser. No. 61/875,518, filed Sep. 9, 2013, which is incorporated in its entirety herein.

BACKGROUND

A power inverter, or inverter, is an electronics device or circuitry that changes direct current (DC) to alternating current (AC). One application of power electronics inverters are in microgrids. Microgrids are small-scale versions of the centralized electricity system. They can achieve specific local goals, such as reliability, carbon emission reduction, diversification of energy sources, and cost reduction, established by the community being served. Like a bulk power grid, smart microgrids can generate, distribute, and regulate the flow of electricity to consumers. Smart microgrids are a way to integrate renewable resources on the community level and allow for customer participation in the electricity enterprise.

BRIEF DESCRIPTION OF THE DRAWINGS

In association with the following detailed description, reference is made to the accompanying drawings, where like numerals in different figures can refer to the same element.

FIGS. 24A and 24B are circuit diagrams of exemplary circuits for (a) linear RLC load and (b) nonlinear diode bridge rectifier load.

FIG. 25 is an oscilloscope screenshot of exemplary measured inverter output currents and load voltage during system startup with an RLC load.

DETAILED DESCRIPTION

Figure 1:
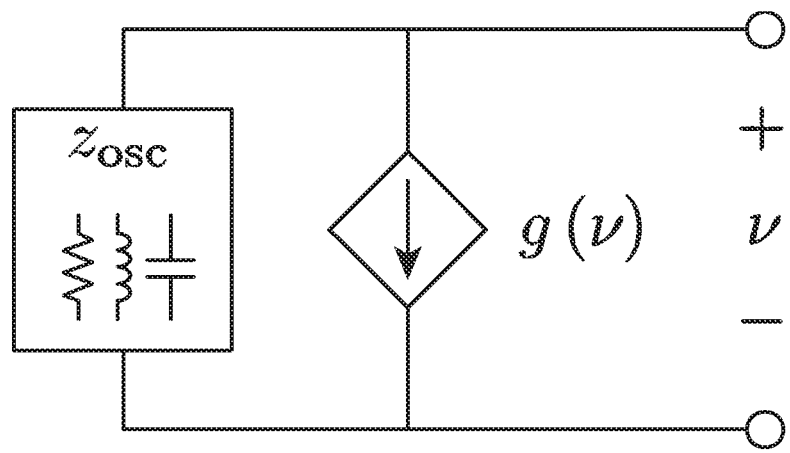
FIG. 1 is a circuit diagram of an exemplary oscillator structure.

A system, method and/or device, etc. are described to control a collection of power electronics inverters. The power electronics inverters only require their localized measurements. No local measurement information, such as system frequency or network-level set-points, needs to be exchanged across the system of inverters. The individual inverters are able to utilize local measurements and determine what to do such that when a large collection of inverters are connected together they work together cohesively as a system. Therefore, power supplies can be synchronized without the need for communication, e.g., an exchange of information.

Synchronization is described for nonlinear oscillators coupled through a linear time-invariant theory (LTI) network. Synchronization of distributed oscillator systems can be utilized in several areas, including neural processes, coherency in plasma physics, communications, and electric power systems. A condition is described herein for the global asymptotic synchronization of a class of identical nonlinear oscillators coupled through an electrical network with LTI elements, e.g., resistors, capacitors, inductors, and transformers. For explanation purposes, in one implementation, symmetric networks including oscillators connected to a common node through identical branch impedances are described. For this type of network, the synchronization condition is independent of: i) the load impedance, and ii) the number of oscillators in the network. The results can be used to formulate a control paradigm for the coordination of inverters serving a passive electrical load in a microgrid. For purposes of explanation the inverters are connected in parallel, but non-parallel connections can also be implemented with the systems and methods.

Because power networks generally include LTI circuit elements (resistors, capacitors, inductors, and transformers), passivity-based synchronization analysis can be difficult to apply in this setting. Additionally or alternatively, the notion of $L_2$ input-output stability can be used to analyze synchronization in systems coupled through an LTI network. Given the differential equations of the original system, a transformation is performed such that an equivalent system based on signal differences is formulated. Referred to herein as a differential system. If the resulting differential system is input-output stable, signal differences decay to zero and oscillator synchronization results. One advantage of this technique is that the analyst does not need to formulate a storage function. Using established $L_2$ input-output stability methods, a sufficient condition for synchronization can be attained. The results described herein can derive from $L_2$ methods because they facilitate analysis of LTI power networks.

For explanation purposes, the results are focused on coupled oscillator systems. A sufficient global asymptotic synchronization condition is derived for a class of identical nonlinear oscillators coupled through an LTI network. For the particular network topology where the oscillators are connected to a common node through identical branch impedances, the synchronization condition is independent of the number of oscillators and the load impedance. From an application perspective, the results can be applied to the coordination of inverters in a single-phase microgrid to achieve a control and design paradigm that is robust (e.g., independent of load) and modular (e.g., independent of number of inverters). Results are presented with a level of generality such that they can be applied to a variety of implementations. Results derived can be applied towards the design and implementation of a microgrid with N parallel inverters, described below.

For the N-tuple $(u_1, \ldots, u_N)$, denote $u=[u_1, \ldots, u_N]^T$ to be the corresponding column vector, where $T$ indicates transposition. The N-dimensional column vectors of all ones and all zeroes are denoted by 1 and 0, respectively. N×N matrices can be denoted by U and they can be diagonalized as $U=Q\Lambda Q^{-1}$, where $\Lambda$ denotes the diagonal matrix of eigenvalues and the column vectors of Q are the corresponding eigenvectors. The Laplace transform of the continuous-time function f(t) is denoted by f(s), where $s=\rho+j\omega$ is a complex number, and $j=\sqrt{-1}$. Transfer functions are denoted by lower-case z(s), and transfer matrices are denoted by upper-case Z(s). Unless stated otherwise, $Z(s)=z(s) I_N$, where $I_N$ is the N×N identity matrix. The Euclidean norm of a real or complex vector, u, is denoted by $\|u\|_2$ and is determined as:

$$\|u\|_2 = \sqrt{u^*u} \tag{1}$$

where * indicates the conjugate transpose. If u is real, then $u^*=u^T$. For some continuous-time function u(t), $u:[0, \infty) \to \mathbb{R}^N$, the $\mathcal{L}_2$ norm of u is determined as $$\|u\|_{\mathcal{L}2} = \sqrt{\int_0^\infty u(t)^T u(t) dt}, \tag{2}$$

and the space of piecewise-continuous and square-integrable functions where $\|u\|_{L_2} < \infty$ is denoted by $\mathcal{L}_2$. If $u \in \mathcal{L}_2$ then u is said to be bounded. A causal system, H, with input u and output y, is said to be finite-gain $\mathcal{L}_2$ stable if there exist finite, non-negative constants, $\gamma$ and $\eta$, such that $$\|y\|_{L_2} = \|H(u)\|_{L_2} \leq \gamma \|u\|_{L_2} + \eta, \ \forall u \in L_2. \tag{3}$$

The smallest value of $\gamma$ for which there exists a $\eta$ such that (3) is satisfied is called the $L_2$ gain of the system. The $L_2$ gain of H, denoted as $\gamma$ (H), provides a measure of the largest amplification applied to the input signal, u, as it propagates through the system H. Intuitively, (3) can be understood as stating that norm of the output, H(u), cannot be larger than the linearly scaled norm of the input u. Hence, the system is described as being input-output stable when the $L_2$ gain of H is finite.

If H is linear and can be represented by the matrix of transfer functions H(s) such that $H(s) \in \mathbb{C}^{N \times N}$, the $L_2$ gain of H is equal to its H-infinity norm, denoted by $\|H\|\infty$, and determined as $$\gamma(H) = \|H\|_\infty = \sup_{\omega \in \square} \frac{\|H(j\omega)u(j\omega)\|_2}{\|u(j\omega)\|_2}, \tag{4}$$

where $\|u(j\omega)\|_2 = 1$, provided that all poles of H(s) have strictly negative real parts. Because (4) is the ratio of the output to input norms, $\gamma$ (H) gives a measure of the largest amplification of the vector u when it is multiplied by the matrix H(s). Stated alternatively, $\gamma$ (H) is the largest singular value of the matrix H(s). Note that if H(s) is a single-input single-output transfer function such that $H(s) \in \mathbb{C}$, then $\gamma$ (H)=

$$\|H\|_\infty = \sup_{\omega \in \square} \|H(j\omega)\|_2.$$

A classical result that can be useful in showing synchronization is Barbalat's lemma. Consider the continuous function $\phi:[0, \infty) \to \mathbb{R}$. Barbalat's lemma states that if $\lim_{t \to \infty} \int_0^t \phi(\tau) d\tau < \infty$, then $$\lim_{t \to \infty} \phi(t) = 0. \tag{5}$$

This property can be used to show that all signal differences decay to zero when the system meets the sufficient condition for synchronization. The electrical networks under study have underlying graphs that are undirected and connected. The corresponding Laplacian matrix, denoted by $\Gamma \in \mathbb{R}^{N \times N}$, has the following properties:

1. rank($\Gamma$)=N−1
2. The eigenvalues of $\Gamma$ (ordered in ascending order by magnitude) are denoted by $\lambda_1 < \lambda_2 < \ldots < \lambda_N$, where $\lambda_1 = 0$.
3. $\Gamma$ is symmetric with row and column sums equal to zero such that $\Gamma 1 = \Gamma^T 1 = 0$.
4. The eigenvector $q_1$ (corresponding to $\lambda_1 = 0$) is given by $$q_1 = \frac{1}{\sqrt{N}} 1.$$

5. The Laplacian can be diagonalized as $\Gamma = Q \Lambda Q^T$, where it follows that $Q^{-1} = Q^T$ because $\Gamma = \Gamma^T$.

A useful construct that can be employed to compare individual oscillator outputs with the average of all N oscillator outputs is the projector matrix, $\Pi$, determined as $$\Pi = I_N - \frac{1}{N} 1 1^T \qquad (6)$$

For some vector $u \in \mathbb{R}^N$, denote $\tilde{u} = \Pi u$, and refer to $\tilde{u}$; as the corresponding differential vector. A causal system, H, with input u and output y, is said to be differentially finite-gain $L_2$ stable if there exist finite, non-negative constants, $\tilde{\gamma}$ and $\tilde{\eta}$ such that $$\|\tilde{y}\|_{L_2} \leq \tilde{\gamma} \|\tilde{u}\|_{L_2} + \tilde{\eta}, \ \forall \tilde{u} \in L_2. \qquad (7)$$

Where $\tilde{y} = \Pi y$. The smallest value of for $\tilde{y}$ for which there exists a $\tilde{\eta}$; such that (7) is satisfied, is called the differential $L_2$ gain of the system and is denoted as $\tilde{\gamma}(H)$. The differential $L_2$ gain provides a measure of the amplification of signal differences as they propagate through a system.

Conditions for global asymptotic synchronization are described. A system-level description of the coupled nonlinear oscillators is provided. The projector matrix is used to derive a corresponding system based on signal differences. Equipped with the differential system description, a sufficient condition can be presented for global asymptotic synchronization of the coupled oscillators.

FIG. 1 is a circuit diagram of an exemplary oscillator structure. The oscillator has: i) a linear subsystem comprised of passive circuit elements with impedance $z_{osc}(s)$, and ii) a nonlinear voltage-dependent current source, g(v). The source g(v) is required to be continuous and differentiable, and additionally requires:

$$\sigma := \sup_{v \in \square} \left| \frac{d}{dv} g(v) \right| < \infty \qquad (8)$$

In other words, the slope of g(v) with respect to the oscillator voltage is bounded.

Consider a system in which N such oscillators are coupled through a passive electrical LTI network, and the coupling is captured through:

$$i(s) = Y(s) v(s) \qquad (9)$$

where $i(s) = [i_1(s), \ldots, i_N(s)]^T$ is the vector of oscillator output currents, $v(s) = [v_1(s), \ldots, v_N(s)]^T$ is the vector of oscillator terminal voltages, and Y(s) is the network admittance matrix of the general form:

$$Y(s) = \alpha(s) I_N + \beta(s) \Gamma, \qquad (10)$$

where $\alpha(s), \beta(s) \in \mathbb{C}$, and $\Gamma$ is the network Laplacian with the properties described in Section 1. The admittance matrix of the microgrid network under consideration does have the form shown in (10). Conceptually, the admittance, $\alpha(s)$, in the first term of (10) can be understood as the local load observed from the output of each oscillator while the second term, $\beta(s)\Gamma$, accounts for the interaction between units. As the system synchronizes, the interaction between oscillators decays to zero and the effective output impedance observed from the each oscillator is equal to $\alpha(s)^{-1}$.

Figure 2:
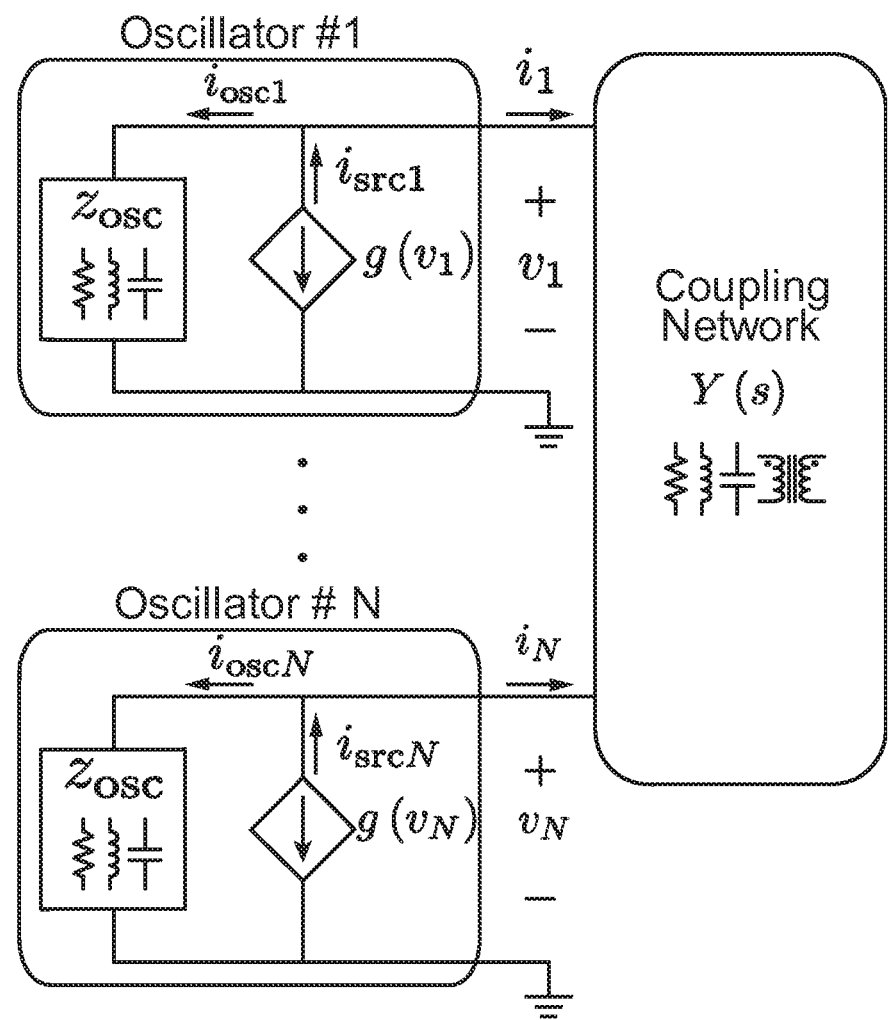
FIG. 2 is a circuit diagram of an exemplary N oscillators interconnected through an LTI network described by the admittance matrix Y(s).

FIG. 2 is a circuit diagram of an exemplary N oscillators interconnected through a coupling network described by the admittance matrix Y(s). The terminal voltage of the $j^{th}$ oscillator, $v_j(s)$, can be expressed as:

$$v_j(s) = z_{osc}(s)(i_{srcj}(s) - i_j(s)), \forall j = 1, \ldots, N. \qquad (11)$$

Figure 3:
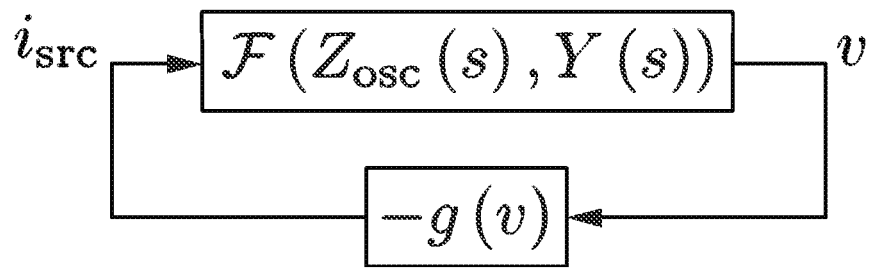
FIG. 3 is a block diagram of an exemplary coupled oscillator system.

Writing all terminal voltages in matrix form yields:

$$v(s) = Z_{osc}(s)(i_{src}(s) - i(s)) \qquad (12)$$
$$= Z_{osc}(s) i_{src}(s) - Z_{osc}(s) Y(s) v(s),$$

where $Z_{osc}(s) = z_{osc}(s) \cdot I_N \in \mathbb{C}^{N \times N}$, $i_{src}(s) = [i_{src1}(s), \ldots, i_{srcN}(s)]^T$, and in the second line of (12), $i(s) = Y(s) v(s)$ from (9) has been substituted. v(s) can be isolated from (12) as follows:

$$v(s) = (I_N + Z_{osc}(s) Y(s))^{-1} Z_{osc}(s) i_{src}(s) \qquad (13)$$
$$= F(Z_{osc}(s), Y(s)) i_{src}(s),$$

where $F: \square^{N \times N} \times \square^{N \times N} \to \square^{N \times N}$ is called the linear fractional transformation. In general, for some A,B of appropriate dimension and domain, the linear fractional transformation is determined as:

$$F(A, B) := (I_N + AB)^{-1} A. \qquad (14)$$

the system of coupled oscillators admits the compact block-diagram representation in FIG. 3), where the linear and nonlinear portions of the system are compartmentalized by $F(Z_{osc}(s), Y(s))$ and $g(v) = [g(v_1), \ldots, g(v_N)]^T$, respectively.

FIG. 3 is a block diagram of an exemplary coupled oscillator system. g(v) is a vector which captures the input-output relation of all the nonlinear circuit elements in the oscillators. Asymptotic synchronization can be utilized in the network introduced above. Oscillator synchronization is determined as:

$$\lim_{t \to \infty} v_j(t) - v_k(t) = 0 \ \forall \ j, k = 1, \ldots, N. \qquad (15)$$

For ease of analysis, it can be useful to transform to a coordinate system based on signal differences. Subsequently, such a system can be referred to as the corresponding differential system. Towards this end, the projector matrix determined in (6) has the following property:

$$v(t)^T v(t) = (\Pi v(t))^T (\Pi v(t)) = \frac{1}{2N} \sum_{j=1}^{N} \sum_{k=1}^{N} (v_j(t) - v_k(t))^2. \qquad (16)$$

Therefore, the synchronization condition in (15) is equivalent to requiring $v(t) = \Pi v(t) \to 0$ as $t \to \infty$.

The corresponding differential system can be derived. The differential terminal-voltage vector, $\tilde{v}(s)$, can be expressed as:

$$\tilde{v}(s) = \Pi v(s) = \Pi(Z_{osc}(s)(i_{src}(s) - i(s))) \quad (17)$$
$$= Z_{osc}(s)(\Pi i_{src}(s) - \Pi Y(s)v(s))$$
$$= Z_{osc}(s)(\tilde{i}_{src}(s) - Y(s)\tilde{v}(s)),$$

where in the first line, v(s) from (12) has been substituted, and in the second line, the relation $i(s)=Y(s)v(s)$ from (9) is used and the fact that $\Pi Z_{osc}(s)=\Pi z_{osc}(s)I_N=z_{osc}(s)I_N\Pi=Z_{osc}(s)\Pi$. The last line follows from the fact that the projector and admittance matrices commute, e.g., $\Pi Y(s)=Y(s)\Pi$. To prove this, for the class of admittance matrices given by (10), note that:

$$\Pi Y(s) = \Pi(\alpha(s)I_N + \beta(s)\Gamma) \quad (18)$$
$$= \alpha(s)I_N\Pi + \beta(s)\Pi\Gamma$$
$$= \alpha(s)I_N\Pi + \beta(s)(I_N - 1/N11^T)\Gamma$$
$$= \alpha(s)I_N\Pi + \beta(s)(\Gamma I_N - 1/N\Gamma 11^T)$$
$$= (\alpha(s)I_N + \beta(s)\Gamma)\Pi = Y(s)\Pi,$$

where the row and column sums of $\Gamma$ are zero is used, which implies $1\ 1^T\ \Gamma=0\ 0^T=\Gamma 1\ 1^T$. $\tilde{v}(s)$ in (17) can now be isolated as follows:

$$\tilde{v}(s) = (I_N + Z_{osc}(s)Y(s))^{-1}Z_{osc}(s)\tilde{i}_{src}(s) \quad (19)$$
$$= F(Z_{osc}(s), Y(s))\tilde{i}_{src}(s).$$

Notice the similarity between (19) and (13). Note that the linear fractional transformation also maps $i_{src}(s)$ to $\tilde{v}(s)$.

Determine a map $\tilde{g}$; that captures the impact of g(v) in the corresponding differential system as follows:

$$\tilde{g}:\tilde{v}\to\tilde{i}_{src} \quad (20)$$

A complete description of the equivalent differential system has been attained. The system admits the block diagram representation in FIG. 4, where, as in FIG. 3, the linear and nonlinear subsystems are compartmentalized using $\mathcal{F}(\cdot,\cdot)$ and $\tilde{g}$, respectively.

Figure 4:
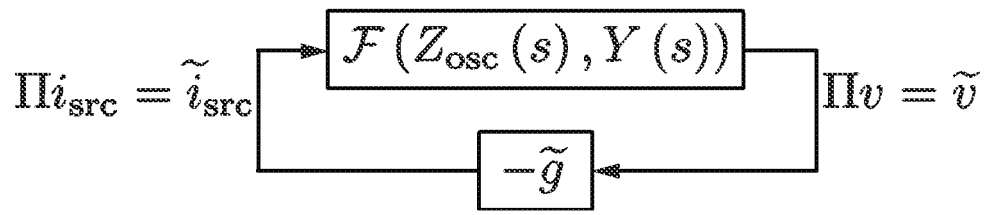
FIG. 4 is a block diagram of an exemplary equivalent differential system which illustrates signal differences.

FIG. 4 is a block diagram of an exemplary equivalent differential system. Conditions are derived that ensure global asymptotic synchronization in the sense of (15) for the system of oscillators described above. Before Theorem 1 is stated, a lemma is first presented which gives an upper bound on the differential $\mathcal{L}_2$ gain of the nonlinearity $g(\cdot)$.

Lemma 1. The differential $\mathcal{L}_2$ gain of g is finite and upper bounded by a such that:

$$\gamma(g) \leq \sigma = \sup_{v\in\square}\left|\frac{d}{dv}g(v)\right| < \infty. \quad (21)$$

By definition of $\sigma$, for any pair of terminal voltages $v_j$ and $v_k$, and the corresponding source currents $i_{srcj}$ and $i_{srck}$, where $j,k\in\{1, \ldots, N\}$, the mean-value theorem can be applied to give:

$$\sigma \geq \frac{|i_{srcj}(t) - i_{srck}(t)|}{|v_j(t) - v_k(t)|} \Rightarrow \sigma^2(v_j(t) - v_k(t))^2 \geq (i_{srcj}(t) - i_{srck}(t))^2. \quad (22)$$

Summing over all indices, $j, k\in\{1, \ldots, N\}$ in (22) yields $$\sigma^2\sum_{j=1}^{N}\sum_{k=1}^{N}(v_j(t) - v_k(t))^2 \geq \sum_{j=1}^{N}\sum_{k=1}^{N}(i_{srcj}(t) - i_{srck}(t))^2, \quad (23)$$

which can be rearranged and simplified as follows $$\sigma \geq \sqrt{\frac{\sum_{j=1}^{N}\sum_{k=1}^{N}(i_{srcj}(t) - i_{srck}(t))^2}{\sum_{j=1}^{N}\sum_{k=1}^{N}(v_j(t) - v_k(t))^2}}. \quad (24)$$

Since (24) holds for any set of terminal voltages, this implies $$\sigma \geq \sup_{v\in\square^N}\sqrt{\frac{\frac{1}{2N}\sum_{j=1}^{N}\sum_{k=1}^{N}(i_{srcj}(t) - i_{srck}(t))^2}{\frac{1}{2N}\sum_{j=1}^{N}\sum_{k=1}^{N}(v_j(t) - v_k(t))^2}}, \quad (25)$$

which can be rewritten compactly using the projector-matrix notation in (16) as $$\sigma \geq \sup_{v\in\square^N}\sqrt{\frac{\tilde{i}_{src}(t)^T\tilde{i}_{src}(t)}{\tilde{v}(t)^T\tilde{v}(t)}}. \quad (26)$$

By definition of the differential $\mathcal{L}_2$ gain, $$\tilde{\gamma}(\tilde{g}) = \sup_{v\in\square^N}\frac{\|\tilde{i}_{src}\|_{L_2}}{\|\tilde{v}\|_{L_2}} \quad (27)$$
$$= \sup_{v\in\square^N}\frac{\sqrt{\int_0^\infty \tilde{i}_{src}(t)^T\tilde{i}_{src}(t)\,dt}}{\sqrt{\int_0^\infty \tilde{v}(t)^T\tilde{v}(t)\,dt}}.$$

Applying (26) in the definition above, $$\tilde{\gamma}(\tilde{g}) \leq \sup_{v\in\square^N}\frac{\sqrt{\sigma^2\int_0^\infty \tilde{v}(t)^T\tilde{v}(t)\,dt}}{\sqrt{\int_0^\infty \tilde{v}(t)^T\tilde{v}(t)\,dt}} = \sigma < \infty, \quad (28)$$

which completes the proof.

A sufficient condition for global asymptotic synchronization can be implemented in the network of oscillators described in Section 2.1.

Theorem 1: The network of N oscillators coupled through (9) with the admittance matrix in (10), synchronizes in the sense of (15), if $$\|F(\zeta(s),\beta(s)\lambda_2\|_\infty\sigma<1, \quad (29)$$

where $\lambda_2$ is the smallest positive eigenvalue of $\Gamma$, and $$\zeta(s) := \frac{z_{osc}(s)}{1 + \alpha(s)z_{osc}(s)}. \quad (30)$$

Consider the block-diagram of the differential system in FIG. 4. Denote the differential $\mathcal{L}_2$ gain of the linear fractional transformation by $\tilde{\gamma}(F(Z_{osc}(s),Y(s)))$. The finite-gain differential $\mathcal{L}_2$ stability of $F(Z_{osc}(s),Y(s))$ gives $$\|\tilde{v}\|_{L_2} \leq \tilde{\gamma}(F(Z_{osc}(s),Y(s)))\|\tilde{i}_{src}\|_{L_2} + \tilde{\eta}, \quad (31)$$

for some non-negative $\tilde{\eta}$. Applying (21) from Lemma 1, it follows that $$\|\tilde{i}_{src}\|_{L_2} \leq \sigma\|\tilde{v}\|_{L_2}. \quad (32)$$

Combining (31) and (32) yields $$\|\tilde{v}\|_{L_2} \leq \tilde{\gamma}(F(Z_{osc}(s),Y(s)))\sigma\|\tilde{v}\|_{L_2} + \tilde{\eta}. \quad (33)$$

It can be required that $$\tilde{\gamma}(F(Z_{osc}(s),Y(s))) \cdot \sigma < 1 \quad (34)$$

Isolating $\|\tilde{v}\|_{L_2}$ leads to $$\|\tilde{v}\|_{L_2} \leq \frac{\tilde{\eta}}{1 - \tilde{\gamma}(F(Z_{osc}(s), Y(s)))\sigma}, \quad (35)$$

which implies that $\tilde{v}; \in \mathcal{L}_2$. It follows from Barbalat's lemma that $$\lim_{t\to\infty} \Box v(t) = 0 \Rightarrow \lim_{t\to\infty} v_j(t) - v_k(t) = 0 \; \forall \; j, k = 1, \ldots, N. \quad (36)$$

That is, if the system of oscillators satisfies the condition in (34), global asymptotic synchronization can be guaranteed.

The result in (29) can now be derived by showing $\tilde{\gamma}(F(Z_{osc}(s),Y(s)))$ equals $\|F(\zeta(s),\beta(s)\lambda_2)\|$. From the definition of the linear fractional transformation in (14), and the general form of the admittance matrix in (10), note that $$F(Z_{osc}(s), Y(s)) = (I_N + Z_{osc}(s)Y(s))^{-1} Z_{osc}(s) \quad (37)$$

$$= (I_N + Z_{osc}(s)(\alpha(s)I_N + \beta(s)\Gamma))^{-1} Z_{osc}(s)$$

$$= ((1 + \alpha(s)z_{osc}(s))I_N + z_{osc}(s)\beta(s)\Gamma)^{-1} Z_{osc}(s)$$

$$= \left(I_N + \frac{z_{osc}(s)}{1 + \alpha(s)z_{osc}(s)}\beta(s)\Gamma\right)^{-1} \frac{z_{osc}(s)I_N}{1 + \alpha(s)z_{osc}(s)}$$

$$= F(\zeta(s)I_N, \beta(s)\Gamma).$$

Because $F(\zeta(s)I_N,\beta(s)\Gamma)$ is a linear system, it follows that the differential $\mathcal{L}_2$ gain of $F(Z_{osc}(s),Y(s))$ can be calculated using the $\mathcal{H}$-infinity norm. By definition of the $\mathcal{H}$-infinity norm and differential $\mathcal{L}_2$ gain, it follows that $$\|F(\zeta(s)I_N, \beta(s)\Gamma)\| = \quad (38)$$

$$\sup_{\omega\in\Box} \frac{\|\tilde{v}(j\omega)\|_2}{\|\tilde{i}_{src}(j\omega)\|_2} = \sup_{\omega\in\Box} \frac{\|(I_N + \zeta(j\omega)\beta(j\omega)\Gamma)^{-1}\zeta(j\omega)\tilde{i}_{src}(j\omega)\|_2}{\|\tilde{i}_{src}(j\omega)\|_2} =$$

-continued $$\sup_{\omega\in\Box} \frac{\|Q(I_N + \zeta(j\omega)\beta(j\omega)\Lambda)^{-1}\zeta(j\omega)Q^T\tilde{i}_{src}(j\omega)\|_2}{\|Q^T\tilde{i}_{src}(j\omega)\|_2},$$

where $\Gamma$ was diagonalized as $\Gamma = Q\Lambda Q^T$ in the second line above. Two observations can be made to simplify (38):

i) The first column of Q is given by $$q_1 = \frac{1}{\sqrt{N}}1.$$

Furthermore, $$1^T \prod = 1^T\left(I_N - \frac{1}{N}11^T\right) = 1^T - \frac{1}{N}(1^T 1)1^T = 0^T.$$

Therefore, the vector $Q^T\tilde{i}_{src}(s) = Q^T\Pi i_{src}(s)$ is given by $$Q^T\tilde{i}_{src}(s) = Q^T\Pi i_{src}(s) = [0, D(s)]^T, \quad (39)$$

where $D(s) \in \mathbb{C}^{N-1\times 1}$ is made up of the non-zero elements of the vector $Q^T\Pi i_{src}(s)$.

ii) Denote the diagonal matrix with diagonal entries comprised of the non-zero eigenvalues of $\Gamma$ by $\Lambda_{N-1}$, i.e., $\Lambda_{N-1} = \text{diag}\{\lambda_2, \ldots, \lambda_N\} \in \Box^{N-1\times N-1}$, Using the two observations highlighted above, (38) can now be simplified as $$\|F(\zeta(s)I_N, \beta(s)\Gamma)\| = \quad (40)$$

$$\sup_{\omega\in\Box} \frac{\|(I_{N-1} + \zeta(j\omega)\beta(j\omega)\Lambda_{N-1})^{-1}\zeta(j\omega)D(j\omega)\|_2}{\|D(j\omega)\|_2} =$$

$$\sup_{j=2,\ldots,N} \left(\sup_{\omega\in\Box}\left(\frac{D^*(j\omega)(1+\zeta(j\omega)\beta(j\omega)\lambda_j)^{-2}\zeta^2(j\omega)D(j\omega)}{D^*(j\omega)D(j\omega)}\right)^{\frac{1}{2}}\right) =$$

$$\sup_{j=2,\ldots,N}\left(\sup_{\omega\in\Box}(1+\zeta(j\omega)\beta(j\omega)\lambda_j)^{-1}\zeta(j\omega)\right) =$$

$$\sup_{j=2,\ldots,N} \|F(\zeta(s), \beta(s)\lambda_j)\|_\infty = \|F(\zeta(s), \beta(s)\lambda_2)\|_\infty,$$

where the last equality follows from the fact that $\|F(\zeta(s),\beta(s)\lambda)\|$ is a decreasing function of $\lambda$. From (34) and (40), (29) is a sufficient condition for global asymptotic synchronization.

Figure 17:
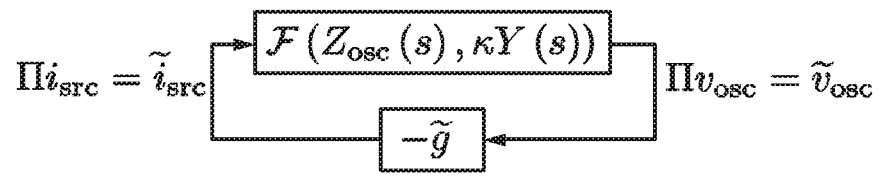
FIG. 17 is a block diagram representation of an exemplary differential system which illustrates signal differences and when scaling gains are used.

The proof for Theorem 1 can be thought of as being based on the closed-loop block-diagram of the differential system in FIG. 17, described below. The $\mathcal{L}_2$ gain provides a measure of the largest amplification imparted by a system as a signal propagates through it. Thus, if the product of the differential $\mathcal{L}_2$ gains, $\tilde{\gamma}(F(Z_{osc}(s),Y(s)))$ and $\tilde{\gamma}(g)$, is less than 1, then the differential vectors, $\tilde{v}$; and $\tilde{i}_{src}$, both decay to zero and oscillator synchronization results. It can equivalently be stated that because the differential system in FIG. 17 is stable, the differential vectors tend towards zero.

The oscillator model which can form the basis of the inverter control can be described and the coupling network of a microgrid with N parallel inverters can be characterized. When Theorem 1 is applied to the system of interest, the synchronization criterion is independent of the number of oscillators and load parameters.

Before describing the oscillator, Liénard's theorem is stated below. The theorem can be used to establish the existence of a stable and unique limit cycle in the particular oscillator under study.

Theorem 2. Consider the system $$\ddot{v} + r(v)\dot{v} + m(v) = 0, \tag{41}$$

where v: $[0, \infty) \to \square$ and r(v),m(v): $R \to R$ are differentiable with respect to v.

The functions, r(v) and m(v), are even and odd, respectively. In addition, determine $$R(v) := \int_0^v r(\tau)d\tau. \tag{42}$$

The system in (41) has a unique and stable limit cycle if: i) $m(v) > 0 \; \forall v > 0$, ii) R(v) has one positive zero for some v=p, iii) R(v)<0 when 0<v<p, and iv) R(v) monotonically increases for $$\lim_{v \to \infty} R(v) = \infty.$$

Figure 5:
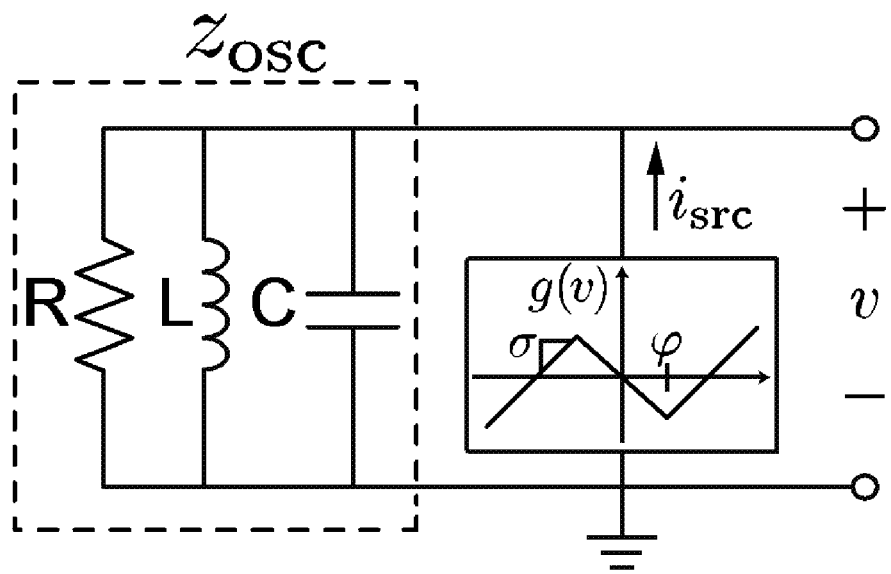
FIG. 5 is a circuit diagram of an exemplary single nonlinear oscillator.
Figures 6A, 6B:
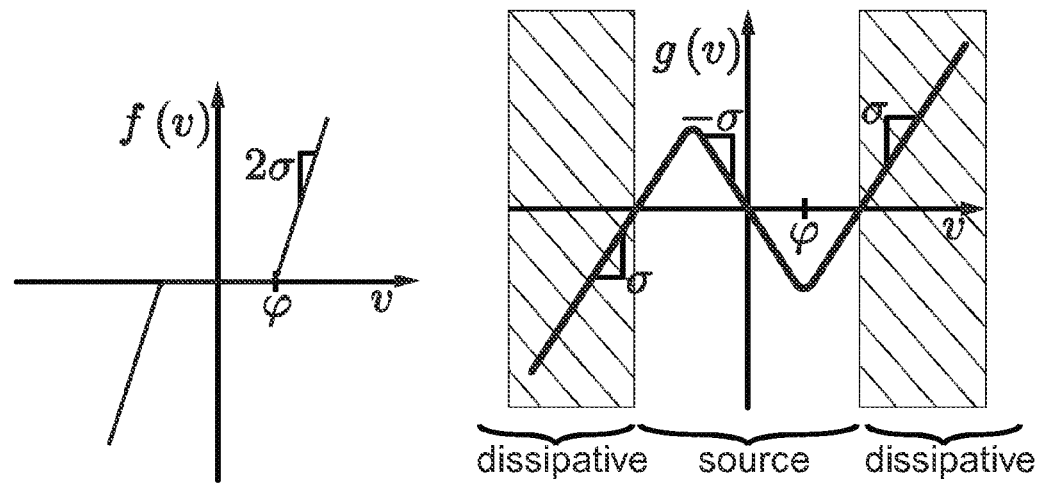
FIGS. 6A and 6B are exemplary function diagrams for a deadzone oscillator.

FIG. 5 is a circuit diagram of an exemplary single nonlinear oscillator. The deadzone oscillator shown in FIG. 5 is used, in which the linear subsystem is includes a RLC circuit with impedance:

$$z_{osc}(s) = R \| sL \| (sC)^{-1} \tag{43}$$

and the nonlinear current source is given by:

$$g(v) = f(v) - \sigma v, \tag{44}$$

where f(•) is a continuous, differentiable deadzone function with slope 2 σ, and $f(v) \equiv 0$ for $v \in (-\phi, +\phi)$, as illustrated in FIG. 6(a). The function g(v), which is plotted in FIG. 6(b), resembles a piecewise linear function. As illustrated in FIG. 6(b), the nonlinear current source, g(v), acts as a power source for v<2 φ and as a dissipative element when v>2 φ. The functions (a) f(v) and (b) g(v) illustrated for the deadzone oscillator. For the deadzone oscillator, $$\sup_{v \in \square} \left| \frac{d}{dv} g(v) \right| = \sigma.$$

A Van der Pol oscillator utilizes a cubic nonlinearity instead of a deadzone nonlinearity as described here.

Using Kirchhoff's voltage and current laws, the terminal voltage of the deadzone oscillator can be determined as:

$$LC\frac{d^2v}{dt^2} + L\left(\frac{df(v)}{dv} + \frac{1}{R} - \sigma\right)\frac{dv}{dt} + v = 0. \tag{45}$$

Number (45) can be rewritten by expressing the derivatives of v with respect to $\tau = t/\sqrt{LC}$ to get:

$$\ddot{v} + \sqrt{\frac{L}{C}}\left(\frac{df(v)}{dv} + \frac{1}{R} - \sigma\right)\dot{v} + v = 0, \tag{46}$$

which is of the form in (41), with:

$$\begin{cases} m(v) = v \\ r(v) = \sqrt{\frac{L}{C}}\left(\frac{df(v)}{dv} + \frac{1}{R} - \sigma\right) \end{cases}. \tag{47}$$

Figures 7A, 7B:
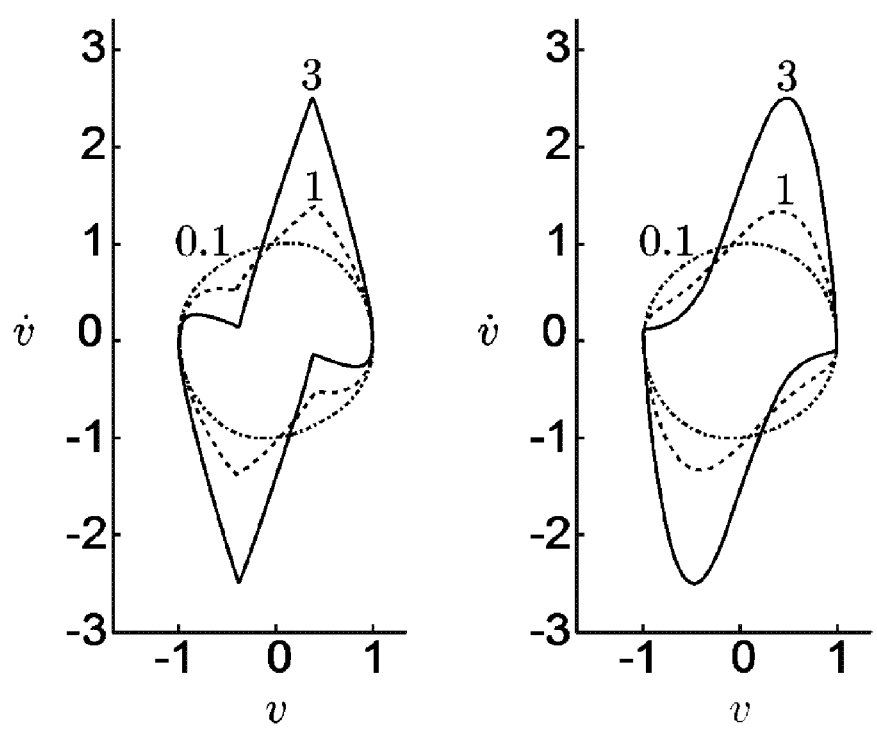
FIGS. 7A and 7B are exemplary phase-plots of steady-state limit-cycles in the (a) deadzone and (b) Van der Pol oscillators for varying $\epsilon$.

For the case σ>1/R, m(v), r(v), and R(v) satisfy the conditions in Linard's theorem, implying that the deadzone oscillator has a stable and unique limit cycle. The steady-state limit cycles of the deadzone oscillator are plotted for different values of $$\dot{o} = \sqrt{\frac{L}{C}}\left(\sigma - \frac{1}{R}\right)$$

in FIG. 7(a). For comparison, the limit cycles of the Van der Pol oscillator for the same set of parameters is shown in FIG. 7(b). When $\epsilon \ll 1$, the steady-state oscillation can have a frequency approximately equal to $$\frac{1}{\sqrt{LC}}.$$

For small values of ε, the phase-plot resembles a unit circle, and as a result, the voltage oscillation approximates an ideal sinusoid in the time-domain.

The oscillation results from a periodic energy exchange between the passive RLC circuit and nonlinear element, g(v), at the RLC resonant frequency, $$\omega_o = \frac{1}{\sqrt{LC}}.$$

The piecewise nonlinearity in FIG. 6(b) acts as a dissipative circuit element when the i-v curve lies in quadrants I and III and as a power source when in quadrants II and IV. As a result, the nonlinear current source injects power into the system for small values of v, and dissipates power for large values of v. The overall tendency is for small oscillations to grow while large oscillations are damped such that a unique steady-state oscillation of some intermediate amplitude is reached.

In the following example, the objective can be to design a 60 Hz deadzone oscillator. The parameters R, L and φ were selected as 10 Ω, 500 μH, and 0.4695 V, respectively. The resonant frequency, denoted as ω o=2 π60 rads, was maintained by choosing $$C = \frac{1}{\omega_o^2 L}.$$

Figure 8:
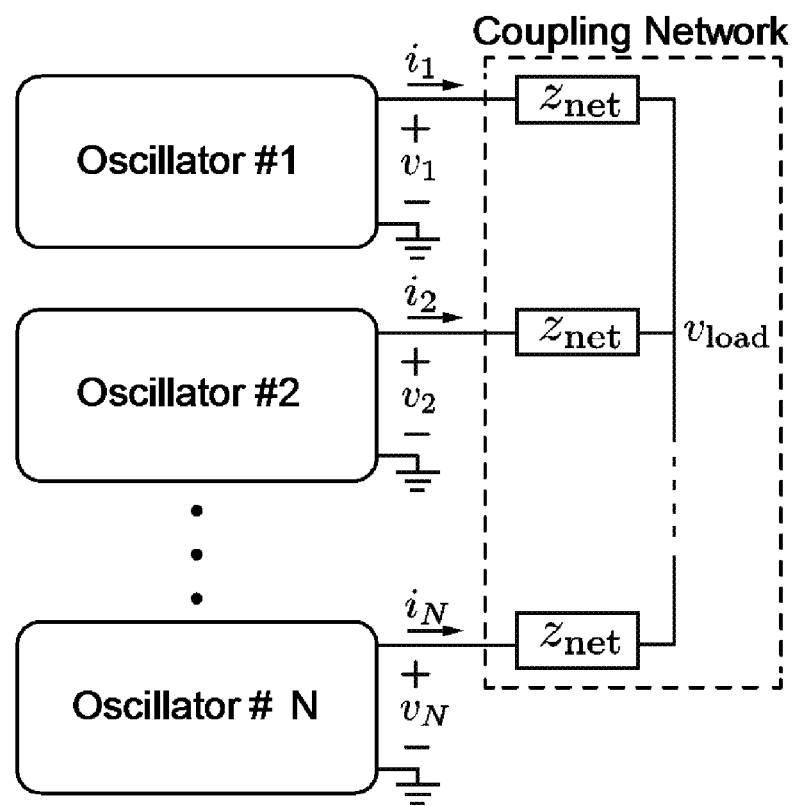
FIG. 8 is a circuit diagram of an exemplary N oscillator with no load.

FIG. 8 is a circuit diagram of an exemplary N oscillators. Microgrids can be made up of N inverters connected across a load. Each oscillator is connected to a common node through a branch impedance, z net (s), which may contain any combination of linear circuit elements. The voltage at the common node to which all the network impedances are connected is denoted by $v_{load}$. When no load is connected to the common node, the oscillator synchronization condition can be shown to be independent of the number of oscillators.

The case where the oscillators deliver power to a load, e.g., connected at the common node can be analyzed and it can be demonstrated that the synchronization condition is the same as the case with no load. This implies that the system can be designed independent of the load parameters and knowledge of number of inverters.

With the system of oscillators connected to no load, the $j^{th}$ oscillator output current is given by:

$$i_j(s) = \frac{1}{z_{net}(s)}(v_j(s) - v_{load}(s)). \tag{48}$$

Since the output currents sum to zero, $$0 = \sum_{k=1}^{N} i_k(s) = \frac{1}{z_{net}(s)}\left(\left(\sum_{k=1}^{N} v_k(s)\right) - Nv_{load}(s)\right). \tag{49}$$

Rearranging terms, $$v_{load}(s) = \frac{1}{N}\sum_{k=1}^{N} v_k(s). \tag{50}$$

Substituting (50) in (48) leads to $$i_j(s) = \frac{1}{z_{net}(s)}\left(v_j(s) - \frac{1}{N}\sum_{k=1}^{N} v_k(s)\right) \tag{51}$$

Writing all output currents in matrix form gives:

$$i(s) = \frac{1}{z_{net}(s)}\left(I_N - \frac{1}{N}11^T\right)v(s) = \frac{1}{Nz_{net}(s)}\Gamma v(s), \tag{52}$$

where $$\Gamma = NI_N - 11^T = \begin{bmatrix} N-1 & -1 & \cdots & -1 \\ -1 & N-1 & \cdots & -1 \\ \vdots & \vdots & \ddots & \vdots \\ -1 & -1 & \cdots & N-1 \end{bmatrix}, \tag{53}$$

for this particular network. The smallest non-zero eigenvalue, $\lambda_2$, of this Laplacian is equal to N. Comparing (52) with (9), $$Y(s) = \frac{1}{Nz_{net}(s)}\Gamma \tag{54}$$

Furthermore, by referring to (10) and (30), for the no-load case $$\begin{cases} \alpha(s) = 0 \\ \beta(s) = (Nz_{net}(s))^{-1} \\ \zeta(s) = z_{osc}(s) \end{cases} \tag{55}$$

Applying $\zeta(s)$, $\beta(s)$, and $\lambda_2$ for this network in the linear fractional transformation of Theorem 1 leads to $$F(\zeta(s), \beta(s)\lambda_2) = (1 + \zeta(s)\beta(s)\lambda_2)^{-1}\zeta(s) \tag{56}$$

$$= \frac{z_{osc}(s)}{1 + z_{osc}(s)(Nz_{net}(s))^{-1}N}$$

$$= \frac{z_{osc}(s)z_{net}(s)}{z_{net}(s) + z_{osc}(s)}$$

$F(\zeta(s), \beta(s)\lambda_2)$ equals the impedance of the parallel combination of $z_{osc}(s)$ and $z_{net}(s)$. Applying (29) of Theorem 1 gives the following synchronization condition:

$$\sup_{\omega \in \square} \left\|\frac{z_{net}(j\omega)z_{osc}(j\omega)}{z_{net}(j\omega) + z_{osc}(j\omega)}\right\|_2 \sigma < 1. \tag{57}$$

Note that the condition for synchronization is independent of N and depends only on the impedance of the oscillator linear subsystem, $z_{osc}(s)$, and the branch impedance, $z_{net}(s)$.

Figure 9:
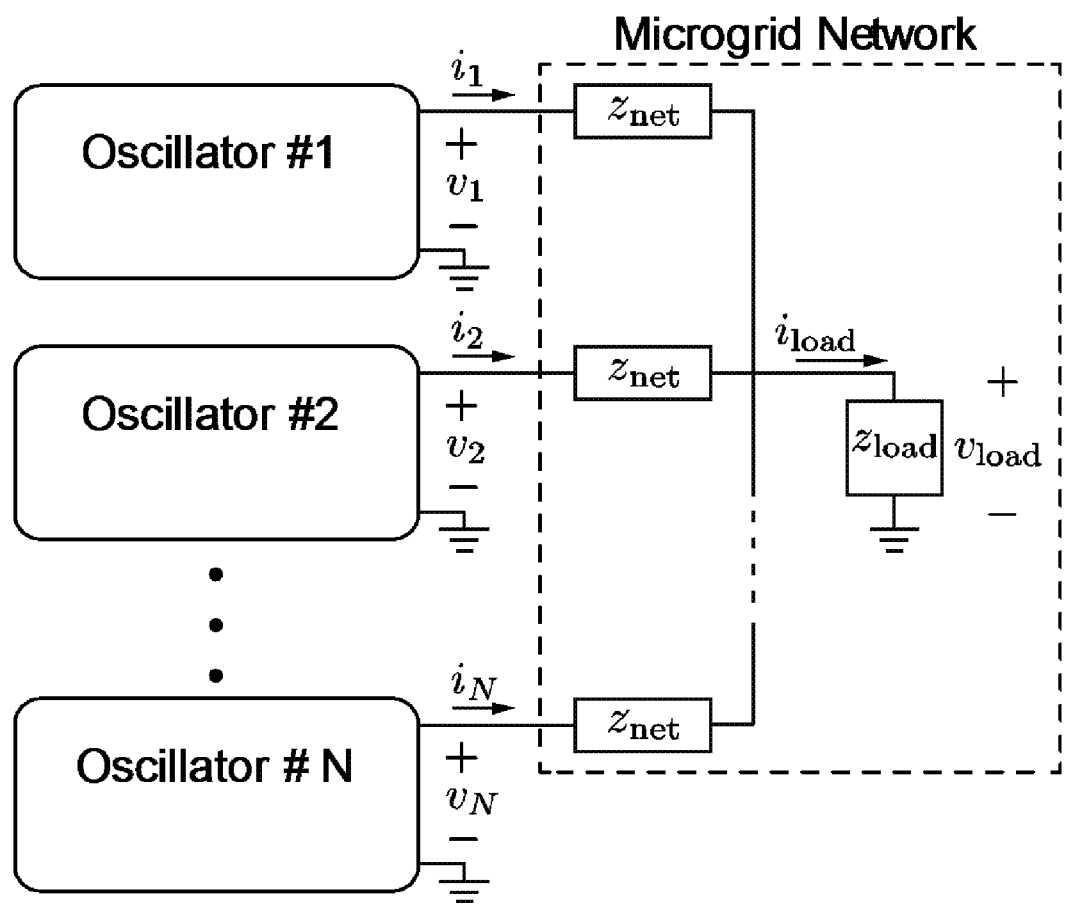
FIG. 9 is a circuit diagram of an exemplary N oscillator with a linear load.

FIG. 9 is a circuit diagram of an exemplary N oscillators with a linear load. The system of oscillators are connected to a passive linear load. The load can be made up of any arbitrary combination of passive LTI circuit elements. The $j^{th}$ oscillator output current is given by (48), and further, $$v_{load}(s) = z_{load}(s)\sum_{k=1}^{N} i_k(s). \tag{58}$$

Substituting (58) in (48) yields $$i_j(s) = \frac{1}{z_{net}(s)}\left(v_j(s) - z_{load}(s)\sum_{k=1}^{N} i_k(s)\right), \tag{59}$$

from which $v_j(s)$ can be isolated to get $$v_j(s) = z_{net}(s)i_j(s) + z_{load}(s)\sum_{k=1}^{N} i_k(s). \tag{60}$$

Collecting all terminal voltages in matrix form yields $$v(s) = (z_{net}(s)I_N + z_{load}(s)11^T)i(s). \tag{61}$$

Comparing (61) with (9) indicates $$Y^{-1}(s) = z_{net}(s)I_N + z_{load}(s)11^T. \tag{62}$$

To invert (62), begin by diagonalizing $11^T = Q\Lambda Q^T$, where $\Lambda = \{0, \ldots, 0, N\} \in \square^{N \times N}$, to get $$Y^{-1}(s) = z_{net}(s)I_N + z_{load}(s)Q\Lambda Q^T \tag{63}$$

$$= z_{net}(s)Q\left(I_N + \frac{z_{load}(s)}{z_{net}(s)}\Lambda\right)Q^T.$$

It can be useful to determine $$z_{eq}(s) := z_{net}(s) + Nz_{load}(s). \tag{64}$$

Inverting the expression in (63) yields $$Y(s) = \frac{1}{z_{net}(s)} Q\left(I_N - \frac{z_{load}(s)}{z_{eq}(s)} \Lambda\right) Q^T \quad (65)$$

$$= \frac{1}{z_{net}(s) z_{eq}(s)} Q(z_{eq}(s) I_N - z_{load}(s) \Lambda) Q^T$$

$$= \frac{1}{z_{net}(s) z_{eq}(s)} ((z_{net}(s) + N z_{load}(s)) I_N - z_{load}(s) 11^T)$$

$$= \frac{1}{z_{net}(s) z_{eq}(s)} (z_{net}(s) I_N + z_{load}(s)(N I_N - 11^T))$$

$$= \frac{1}{z_{net}(s) z_{eq}(s)} (z_{net}(s) I_N + z_{load}(s) \Gamma),$$

where in the third line above, the definition of $z_{eq}(s)$ from (64) was used, and in the last line, the $\Gamma$ determined in (53) was utilized. Comparing (65) with (10), and using (30), it is evident that for the linear-load case:

$$\begin{cases} \alpha(s) = z_{eq}^{-1}(s) \\ \beta(s) = z_{load}(s) z_{net}(s) z_{eq}^{-1}(s) \\ \zeta(s) = z_{osc}(s) z_{eq}(s)(z_{osc}(s) + z_{eq}(s))^{-1} \end{cases} \quad (66)$$

As the system synchronizes and the interaction between oscillators decays to zero, the effective impedance observed from the output of the oscillator is equal to $z_{eq}(s) = z_{net}(s) + N z_{load}(s)$. In other words, the effective load seen by each oscillator during synchronized system conditions is equal to $z_{eq}(s)$.

For the $\zeta(s)$ and $\beta(s)$ in (66), it follows that $$F(\zeta(s), \beta(s)\lambda_2) = (1 + \zeta(s)\beta(s)\lambda_2)^{-1} \zeta(s) \quad (67)$$

$$= \frac{z_{osc} z_{eq}(z_{osc} + z_{eq})^{-1}}{1 + z_{osc} z_{eq}(z_{osc} + z_{eq}) z_{load} z_{net}^{-1} z_{eq}^{-1} N}$$

$$= \frac{z_{osc}}{z_{eq}^{-1}(z_{osc} + z_{eq}) + z_{osc} z_{eq}^{-1} z_{load} z_{net}^{-1} N}$$

$$= \frac{z_{osc}}{1 + z_{osc} z_{eq}^{-1}(1 + z_{load} z_{net}^{-1} N)}$$

$$= \frac{z_{osc}}{1 + z_{osc} z_{eq}^{-1}(z_{eq} z_{net}^{-1})} = \frac{z_{osc}(s) z_{net}(s)}{z_{net}(s) + z_{osc}(s)}.$$

Applying (29), the synchronization condition $$\sup_{\omega \in \square} \left\| \frac{z_{net}(j\omega) z_{osc}(j\omega)}{z_{net}(j\omega) + z_{osc}(j\omega)} \right\|_2 \sigma < 1 \quad (68)$$

follows, which is the same condition as the no-load case in (57). The synchronization condition is independent of the number of oscillators and the load impedance.

Figure 10:
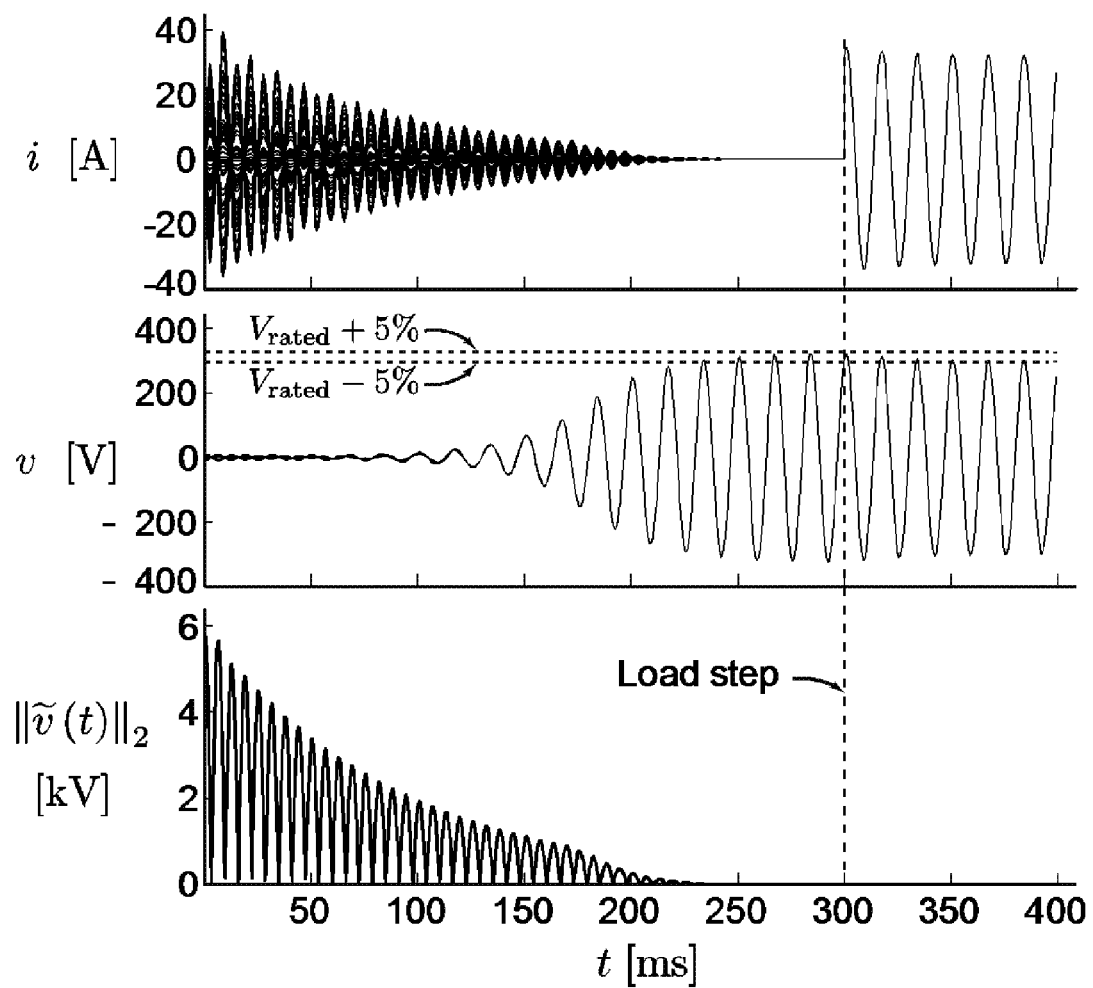
FIG. 10 is a plot of exemplary inverter output currents, voltages, and voltage synchronization error when synchronization is guaranteed.

FIG. 10 is a plot of exemplary inverter output currents, voltages, and voltage synchronization error. Simulation results validate the synchronization condition. It can be demonstrated that a system of inverters controlled as dead-zone oscillators satisfying (29) can synchronize in a passive electrical network and deliver power to a load. In the case studies, a network with the topology in FIG. 9 can be considered. The network branch impedance is given by $z_{net}(s) = sL_{net} + R_{net}$, where $L_{net}$ and $R_{net}$ correspond to the combined line and inverter-output-filter inductance and resistance, respectively, e.g., the inverter output-filter inductance is used to reduce harmonics in the inverter output current that arises due to switching). It is assumed that the load is resistive such that $z_{load}(s) = R_{load}$.

TABLE 1

System parameters used in the case studies.

| | Case Study I, II |
|---|---|
| N | 100 |
| R | 8.66 Ω |
| L | 433.2 µH |
| C | 16.2 mF |
| σ | 1.15 S |
| φ | 146.1 V |
| ε | 0.170 |
| $R_{net}$ | 0.1 Ω, 0.02 Ω |
| $L_{net}$ | 500 µH |
| $R_{load}$ | 91.96 mΩ |

For this system, the linear fractional transformation is given by $$F(z_{osc}(s), z_{net}^{-1}(s)) = \frac{z_{osc}(s) z_{net}(s)}{z_{net}(s) + z_{osc}(s)} \quad (69)$$

$$= \frac{\frac{1}{C} s}{s^2 + \frac{1}{RC} s + \frac{1}{LC} + \frac{s}{C}(L_{net} s + R_{net})^{-1}}$$

$$= \frac{(L_{net} s + R_{net}) s}{L_{net} C s^3 + \left(\frac{L_{net}}{R} + R_{net} C\right) s^2 + \left(\frac{L_{net}}{L} + \frac{R_{net}}{R} + 1\right) s + \frac{R_{net}}{L}}.$$

The design objective is to select R, L, C, σ, and φ for a given $z_{net}(s)$, such that the load voltage and system frequency meets performance specifications. To help guarantee synchronization, the system design satisfies the synchronization condition $\|F(z_{osc}(j\omega), z_{net}^{-1}(j\omega))\|_\infty \sigma < 1$. The material below describes a parameter selection technique which determines that the inverters oscillate at the desired frequency and that in steady-state $v_{load}$ stays within ±5% of the rated voltage across the entire load range (no-load to maximum rated load). In case studies I and II, a power system including 100 parallel inverters which are each rated for 10 kW is simulated. The RMS voltage and frequency ratings of the system are 220 V and 60 Hz, respectively, and the maximum load power is 1 MW. The system parameters used in each case study are summarized in Table 1.

In FIG. 10, inverter output currents, voltages, and voltage synchronization error is shown in the case when $\|F(z_{osc}(j\omega), z_{net}^{-1}(j\omega))\|_\infty \sigma < 1$. Substituting the corresponding values in Table 1 into (69), $\|F(z_{osc}(j\omega), z_{net}^{-1}(j\omega))\|_\infty \sigma = 0.77 < 1$. Therefore, synchronization of the oscillator system is guaranteed. At t=0, currents are zero and the oscillator capacitor voltages are chosen to be uniformly distributed between ±10 V. Initially, the system contains no load. After successful synchronization, the load is abruptly added at t=300 ms. As shown in FIG. 8, the voltage stays within ±5% of the rated value during steady-state conditions.

Figure 11:
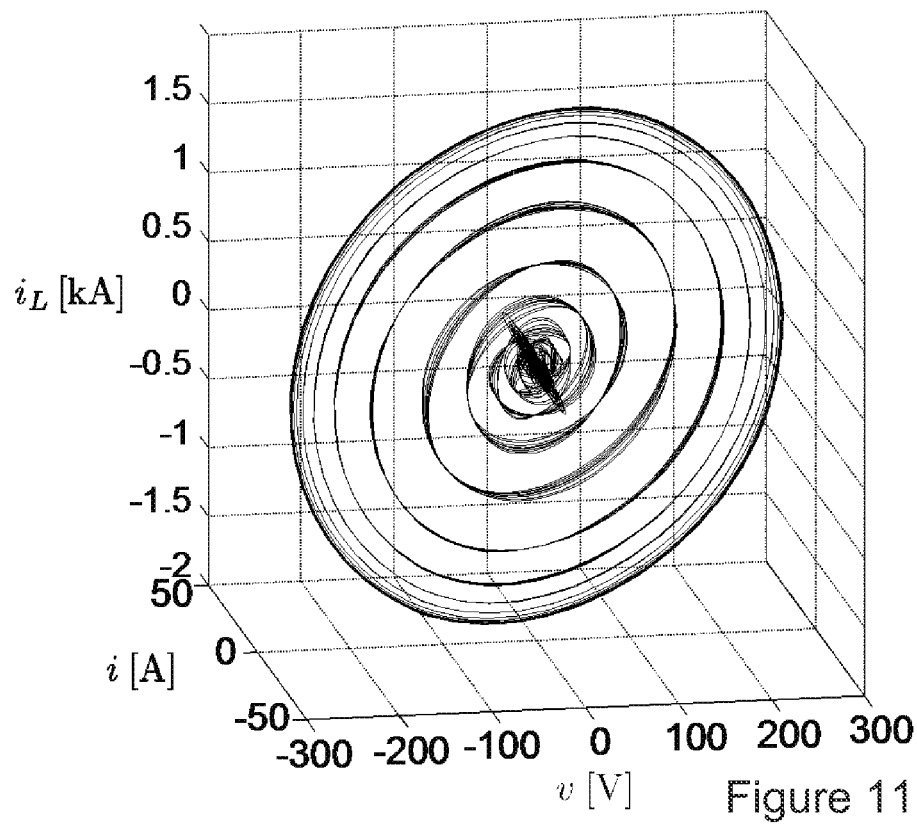
FIG. 11 is a plot of an exemplary evolution of state-variables during startup in the presence of a load.

FIG. 11 is a plot of an exemplary evolution of state-variables during startup in the presence of a load. Waveforms for 10 (out of 100 simulated) are shown for clarity. A second simulation was prepared to demonstrate synchronization in the presence of the load. The load is connected at t=0 s. Given initial conditions as used above, FIG. 11 shows the trajectories of the state-variables (only 10 out of 100 waveforms are shown for clarity). The inductor current within the oscillator RLC circuit is denoted as $i_L$. The state-variables reach a stable limit-cycle.

Figure 12:
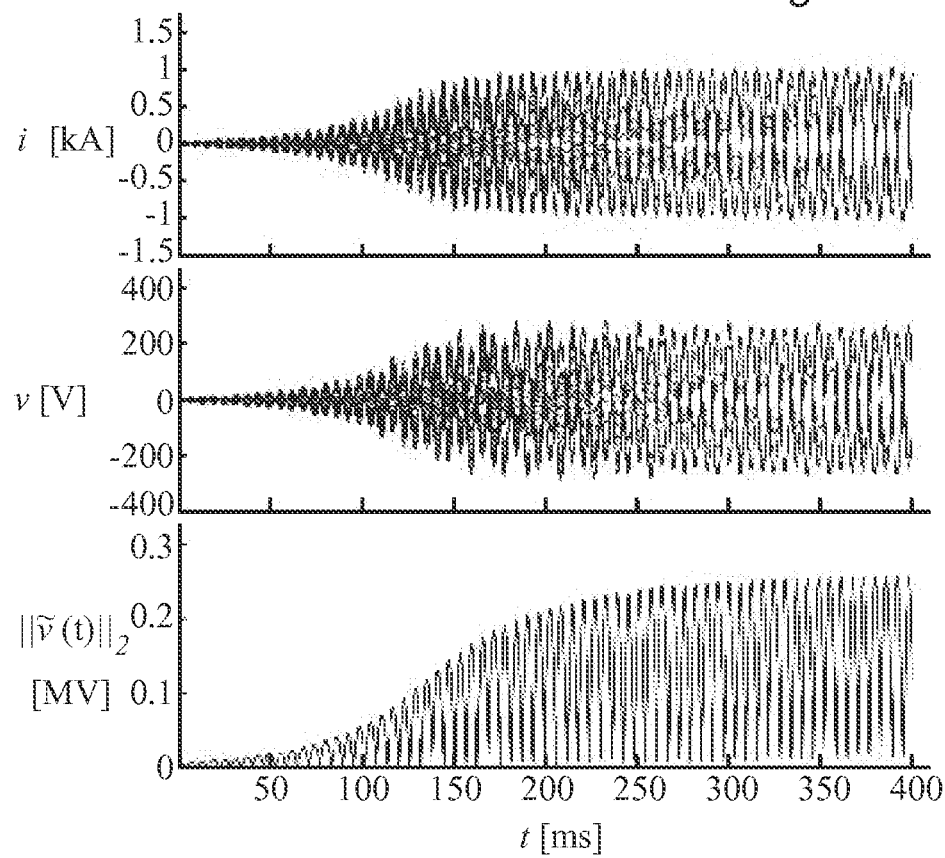
FIG. 12 is a plot of exemplary inverter output currents, voltages, and voltage synchronization error when synchronization is not guaranteed and not achieved.

FIG. 12 is a plot of exemplary inverter output currents, voltages, and voltage synchronization error when $\|F(z_{osc}(j\omega), z_{net}^{-1}(j\omega))\|_\infty \sigma = 2.78$ Ž1 and synchronization is not guaranteed. All parameters, except $R_{net}$, and initial conditions described in FIG. 11 were re-used. The value of $R_{net}$ was reduced such that $\|F(z_{osc}(j\omega), z_{net}^{-1}(j\omega))\|_\infty \sigma \geq 1$, and synchronization is not guaranteed. At t=0, the load is connected to the system. As illustrated in FIG. 12, the inverters do not reach synchrony.

The inverters in a microgrid can be controlled to act as nonlinear oscillators. The resulting microgrid is modular and does not require communication between inverters. A general theorem gives a synchronization condition for N nonlinear oscillators coupled through an LTI electrical network. When this theorem is applied to N oscillators connected in parallel across a load, the synchronization condition is independent of N and the load parameters. Simulation results are used to substantiate the analytical framework and illustrate the merit of the application. Practical design and implementation techniques are described below.

Figure 13B:
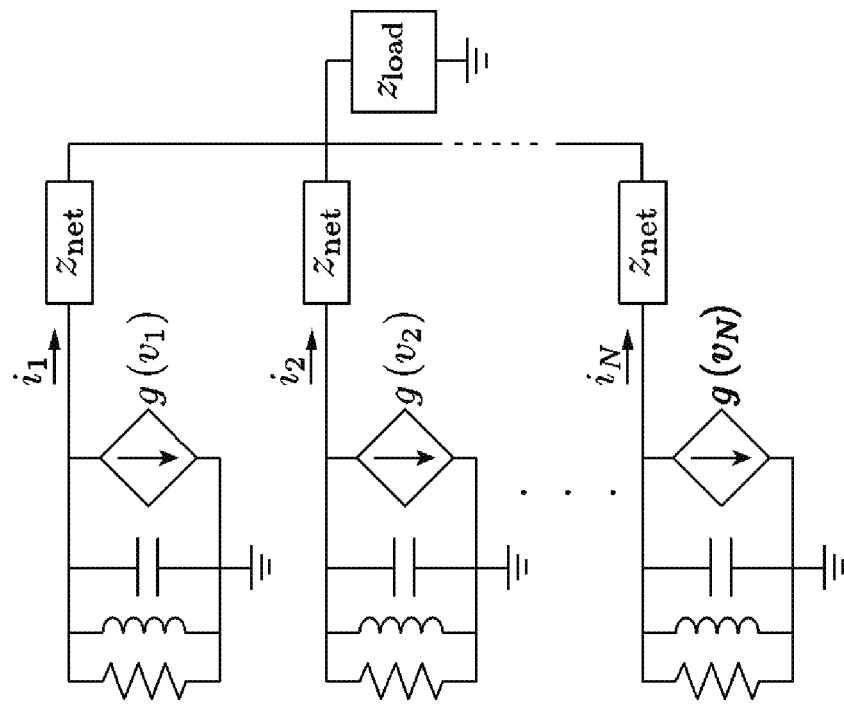
FIG. 13A is a circuit diagram of exemplary inverters that are controlled to emulate the exemplary oscillators in FIG. 13B.
Figure 13A:
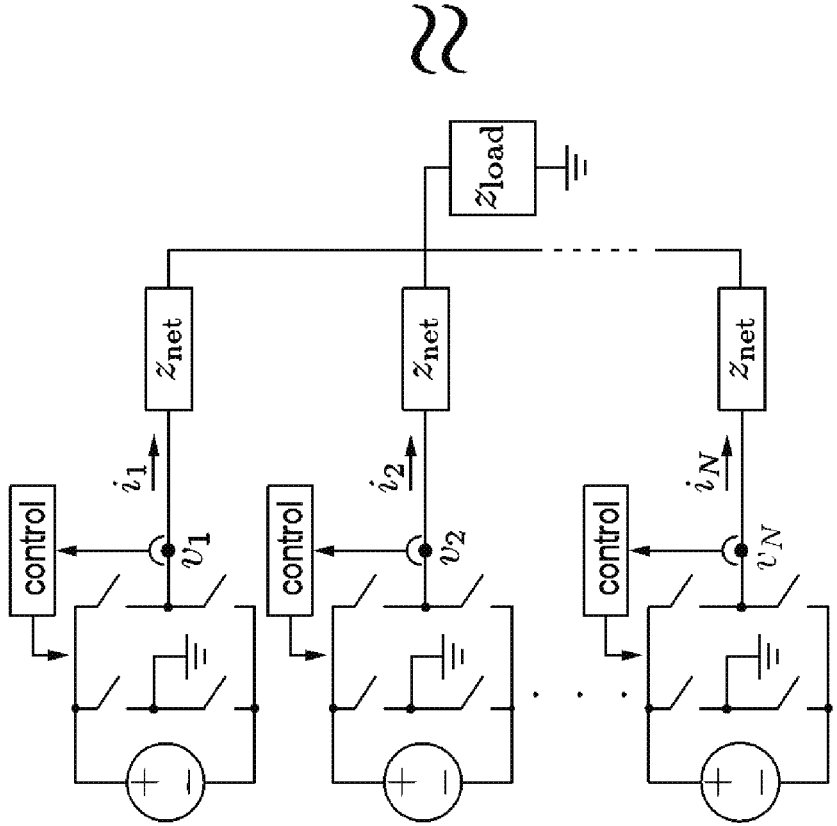

FIG. 13A is a circuit diagram of exemplary inverters that are controlled to emulate the exemplary oscillators in FIG. 13B. The parallel inverters can be coordinated such that each inverter is digitally controlled, e.g., virtual oscillator control, to mimic the nonlinear oscillators discussed above. In one implementation, a microgrid with N parallel inverters can be controlled as deadzone oscillators. The system synchronization condition described above depends only on the oscillator parameters and output filter impedance of a single inverter. Here, the result is applied by putting forward a design procedure based on the parameters of one inverter. A system and method for adding inverters into an energized microgrid is also introduced and exemplary results are presented.

A system of parallel single-phase voltage source inverters in a microgrid is shown in FIG. 13A. Objectives are to control the system of inverters such that communication between inverter controllers is unnecessary, the load is shared equally between inverters, all alternating current (AC) outputs synchronize and oscillate at the desired frequency, inverter synchronization is guaranteed for any number of parallel inverters, and load voltage is maintained within desired limits. The inverters in FIG. 13A can be controlled to mimic the system of parallel deadzone oscillators in FIG. 13B such that the above objectives are satisfied. A method of controlling inverters by digital means such that they act as deadzone oscillators is also described.

Figure 14:
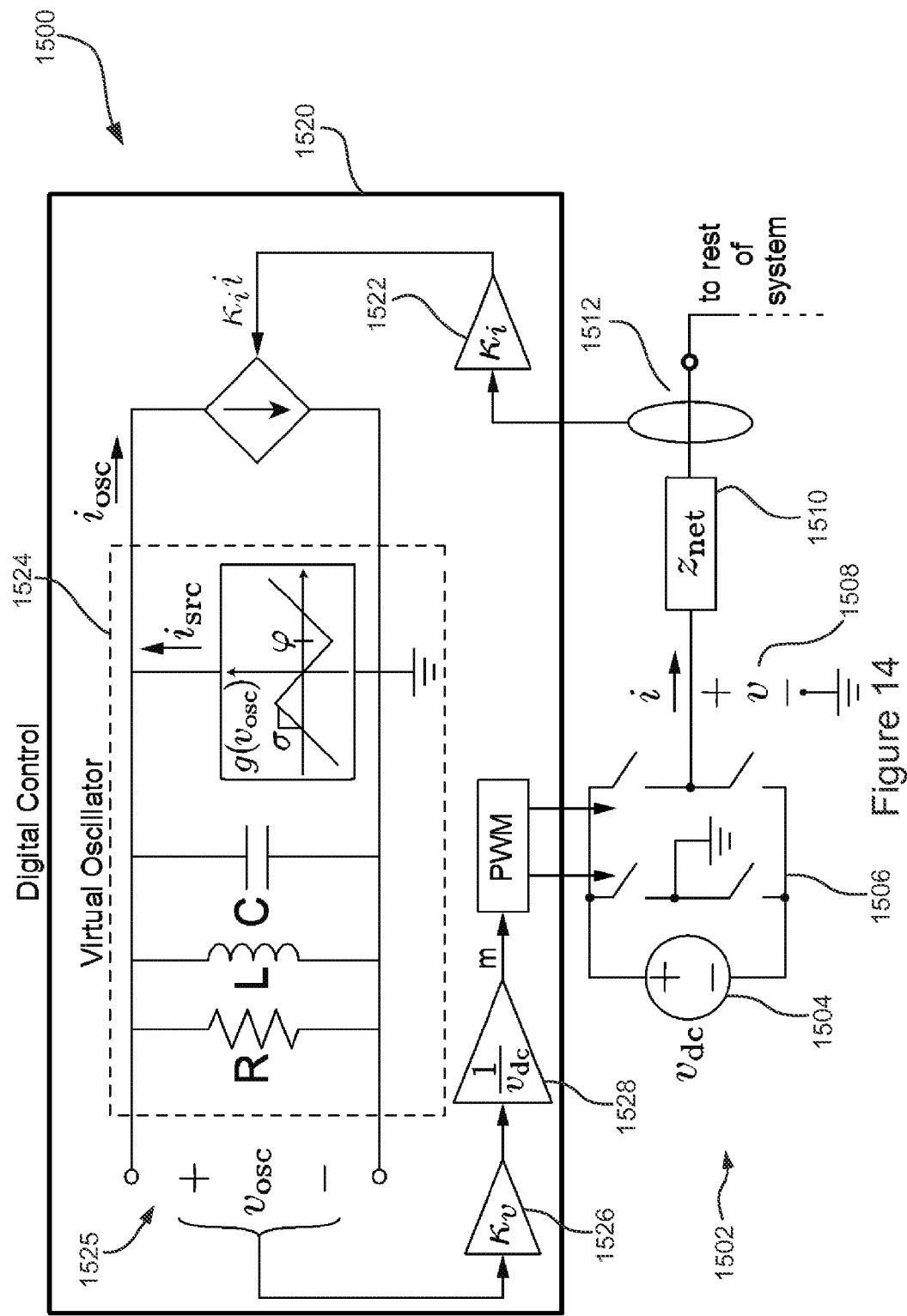
FIG. 14 is a circuit diagram of an exemplary single-phase voltage source inverter with virtual oscillator control.

FIG. 14 is a circuit diagram of an exemplary single-phase voltage source inverter with virtual oscillator control. To control a single-phase inverter such that it mimics a deadzone oscillator, the differential equations of the oscillator can be programmed on the digital controller of the inverter. Because the deadzone oscillator need not physically exist, it is described as being virtual. A representative implementation of the control on a single-phase H-bridge inverter is given in FIG. 14. The measured output current of the inverter is scaled by $\kappa_i$ and extracted from the virtual oscillator. The oscillator voltage is then multiplied by $\kappa_v$ and used to generate a modulation signal, m. The inverter switching signals are generated by applying a pulse width modulation technique, e.g., sine-triangle pulse width modulation or another technique.

The inverter emulates the dynamics of the nonlinear oscillator such that the inverter output voltage, v, follows the scaled oscillator voltage, $\kappa_v v_{osc}$. The current extracted from the virtual oscillator is equal to the scaled output current, $\kappa_i i$. The scaling parameters, $\kappa_v$ and $\kappa_i$, can be used to aid the design process, as described below.

The inverter is an electronics device or circuitry that changes direct current (DC) to alternating current (AC). The input voltage, output voltage and frequency, and overall power handling, can be implementation dependent. For exemplary purposes, an inverter 1500 includes power electronics 1502. The power electronics 1502 includes a DC energy source 1504 which generates a DC voltage $V_{dc}$, e.g., by battery, fuel cell, etc., and switches 1506 to convert the DC voltage $V_{dc}$ to an AC voltage V 1508. FIGS. 34-37 illustrate an exemplary circuit for three phase voltage. The switches 1506 can be implemented with semiconductors, etc. $Z_{net}$ 1510 is filtering, e.g., passive inductors and capacitors, connected at an output of the of the power electronics 1502 to filter noise from the power electronics switching. At 1512, the current i is determined, e.g., measure or otherwise captured, and digitized, e.g., with an analog-to-digital converter.

The digitized, measured current i can be inputted to microcontroller 1520 using analog to digital converters. The measured current i can be scaled by value $K_i$ 1522 to obtain $K_i i$ for inputting into the virtual oscillator 1524. The virtual oscillator 1524 can be implemented with physically and/or with code stored in memory and executed by a processor of the microcontroller 1520. The virtual oscillator 1524 can be emulated in real time and the voltage across the oscillator $v_{osc}$ 1525 is scaled by $K_v$ 1526, and divided by the value of the dc-link voltage 1528, and inputted as m into the pulse width modulator (PWM) 1530 for sending signals to control the switching of the switches 1506. The average voltage, V, across the terminals of the power electronics 1502 follows the scaled oscillator voltage $K_v V_{osc}$ after 1526. As described in more detail, below, the virtual oscillator 1524 and its parameters, R, L, C, σ, and φ, can be selected for a given z net (s), such that the load voltage and system frequency meets performance specifications while also to guaranteeing synchronization of inverters. The system design can satisfy the synchronization condition $\|F(z_{osc}(j\omega), z_{net}^{-1}(j\omega))\|_\infty \sigma < 1$, e.g., if the synchronization condition is less than one then inverters will synchronize. The virtual oscillator 1524 can be designed for one inverter and when the same inverters are added to the system the AC output of the inverters can self-synchronize such that the inverter ac terminal voltages differences decay to zero.

When the inverters are connected in a network, e.g., power grid or other network, the inverters utilize measurements local to themselves, without a need to exchange information between the inverters, yet the inverters oscillate in unison. Voltage limits are respected across a no-load to a maximum rated load range. The inverters can automatically synchronize across network, e.g., upon adding or removing a power electronics inverter to the network. The synchronization can occur without a phase lock loop to generate sinusoidal reference waveforms. The synchronization can also occur without a proportional-integral (PI) or proportional-integral-derivative (PID) controller. The synchronization is agnostic to the number of inverters and loads. Since the controller acts on the instantaneous measurements and does not require real and reactive power calculations, the controller can be significantly faster. The inverters can share a load power proportional to their size, e.g., the inverters can provide as much power to the load in accordance with their ratings. For example, an inverter that has twice the power rating as another inverter can automatically provide twice as much power as the smaller inverter, without the need for communicating the power rating information between inverters.

The inverters 1500 can further include a pre-synchronization circuit, described below in FIG. 19, to match the inverters before adding them to the network. The pre-synchronization circuit can prevent excessive current through the inverter 1500 when adding the inverter 1500 to the system. The pre-synchronization circuit processes the measured voltage across the output terminals of the power electronics switches 1502 such that the oscillator voltage locks on to the voltage at the terminals. Once the internal oscillator voltage has converged to the measured voltage, the inverter 1500 is energized and delivers power to the network. The power electronics switches 1502 can also be interleaved to help cancel distortion generated by the system of inverters.

Figure 15:
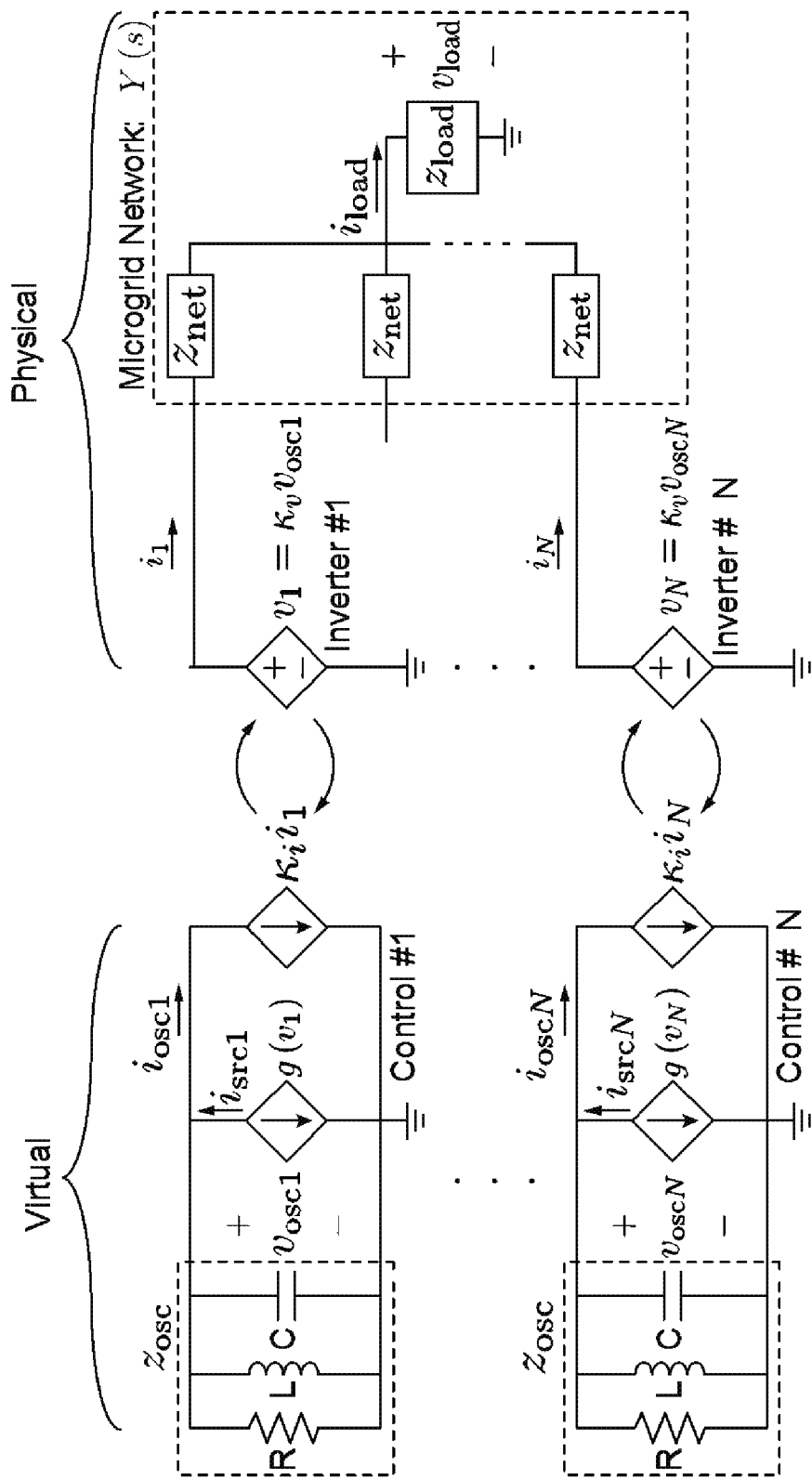
FIG. 15 is a circuit diagram of an averaged model of N connected inverters and associated virtual oscillator controllers coupled through a microgrid network.

FIG. 15 is a circuit model of N connected inverters and associated virtual oscillator controllers coupled through a microgrid network. The dynamic system equations of an inverter system with the control implementation are described below. The parallel topology with a load is considered since it is more general than the system with no load. The virtual system of oscillators reside within the digital controllers, and a system of inverters is coupled through a physical electrical network. After the system equations are derived, the theorem described above can be used to attain a synchronization condition.

Each inverter is digitally controlled to mimic the dynamics of a deadzone oscillator. A system of N connected inverters with virtual oscillator control can be modeled using the diagram in FIG. 15. The system on the left represents the N virtual oscillators which reside within the microcontroller associated for each inverter. Dynamics of the circuit, e.g., equations and transfer functions of the systems and methods, can be programmed into the microcontroller. The right-hand side of the diagram is a representation of the N inverters and the microgrid network. The averaged dynamics of the $j^{th}$ inverter is modeled as the controlled voltage source $v_j$ and $v=[v_1(s), \ldots, v_N(s)]^T$ is the vector of inverter voltages. Using FIG. 15, the inverter voltages and currents are related by $$i(s) = Y(s)v(s), \quad (70)$$

where $i(s)=[i_1(s), \ldots, i_N]^T$ of is the vector of inverter output currents and $Y(s)$ is the network admittance transfer matrix. The admittance matrix for the network in FIG. 15 can be written as $$Y(s) = \frac{1}{z_{net}(s)z_{eq}(s)}(z_{net}(s)I_N + z_{load}(s)\Gamma). \quad (71)$$

Recall that $z_{eq}(s)$ is determined as $$z_{eq}(s):=z_{net}(s)+Nz_{load}(s), \quad (72)$$

and the Laplacian, $\Gamma$, for this network is given by (53).

From FIG. 15, it follows that the voltage of the $j^{th}$ virtual oscillator, $v_{oscj}(s)$, can be expressed as $$v_{oscj}(s)=z_{osc}(s)(i_{srcj}(s)-i_{oscj}(s)), \forall j=1, \ldots, N, \quad (73)$$

where $i_{oscj}(s)$ is the output current the $j^{th}$ virtual oscillator. The output voltages and currents of the $j^{th}$ oscillator and inverter are related by $$v_{oscj}(s)\kappa_v = v_j(s), \quad (74)$$

and $$i_{oscj}(s) = i_j(s)\kappa_i; \quad (75)$$

where $\kappa_v, \kappa_i \in \mathbb{R}$ are the voltage and current scaling gains, respectively. From Equations (74) and (75), it is apparent that the inverter voltage equals the scaled oscillator voltage and the oscillator output current is the scaled inverter output current. It can be useful to define:

$$\kappa:=\kappa_i\kappa_v \quad (76)$$

Writing all N oscillator voltages in matrix form gives $$v_{osc}(s) = Z_{osc}(s)(i_{src}(s) - i_{osc}(s)) \quad (77)$$
$$= Z_{osc}(s)(i_{src}(s) - \kappa_i i(s))$$
$$= Z_{osc}(s)i_{src}(s) - \kappa Z_{osc}(s)Y(s)v_{osc}(s).$$

Figure 16:
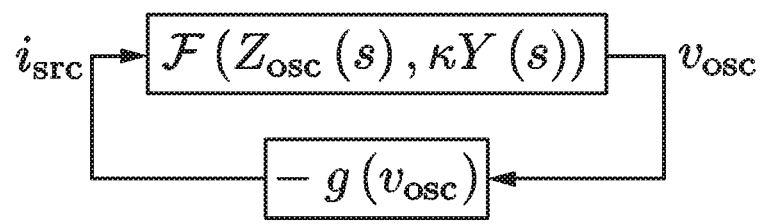
FIG. 16 is a block diagram representation of an exemplary coupled oscillator system when scaling gains are used.

In the second line, (75) is substituted for $i_{osc}(s)$, and in the last line $i(s)=Y(s)v(s)=\kappa_v Y(s) v_{osc}(s)$ comes from the substitution of (74) into $v(s)$. Solving for $v_{osc}(s)$ in (77) yields:

$$v_{osc}(s) = (I_N + \kappa Z_{osc}(s)Y(s))^{-1} Z_{osc}(s)i_{src}(s) \quad (78)$$
$$= F(Z_{osc}(s), \kappa Y(s))i_{src}(s),$$

where $F(Z_{osc}(s),\kappa Y(s))$ is the linear fractional transformation as determined in (14). Using (78), the system of coupled virtual oscillators can be represented as the block-diagram in FIG. 16 where the linear and nonlinear portions of the system are compartmentalized by $F(Z_{osc}(s),\kappa Y(s))$ and $g(v)=[g(v_1), \ldots, g(v_N)]^T$, respectively. Linear and nonlinear portions of the system are contained in $F(Z_{osc}(s),\kappa Y(s))$ and $g(v)=[g(v_1), \ldots, g(v_N)]^T$, respectively.

To analyze global asymptotic synchronization in the network of virtual oscillators described above, synchronization can be described by the condition $$\lim_{t \to \infty} v_{oscj}(t) - v_{osck}(t) = 0 \ \forall \ j, k = 1, \ldots, N. \quad (79)$$

Because the inverter voltages equal the scaled oscillator voltages within the controllers, it follows that virtual oscillator synchronization implies inverter voltage synchronization. Applying the projector matrix to the vector of oscillator voltages gives $$\tilde{v}_{osc}(t)^T \tilde{v}_{osc}(t) = \left(\prod v_{osc}(t)\right)^T \left(\prod v_{osc}(t)\right) \quad (80)$$
$$= \frac{1}{2N} \sum_{j=1}^{N} \sum_{k=1}^{N} (v_{oscj}(t) - v_{osck}(t))^2.$$

Recall that the projector matrix, $\Pi$, is determined in (6). The oscillator voltage synchronization results when $\tilde{v}_{osc}(t) = \Pi v_{osc}(t) \to 0$ as $t \to \infty$. Following along the same lines of the previous analysis, it can be shown that $$\tilde{v}_{osc}(s) = (I_N + \kappa Z_{osc}(s)Y(s))^{-1}Z_{osc}(s)\tilde{i}_{src}(s) \quad (81)$$
$$= F(Z_{osc}(s), \kappa Y(s))\tilde{i}_{src}(s).$$

The map $\tilde{g}: \mathbb{R}^N \to \mathbb{R}^N$ captures the impact of g(v) in the corresponding differential system and is determined as follows:

$$\tilde{g}: \tilde{v}_{osc} \to \tilde{i}_{src} \quad (82)$$

Equations (81) and (82) form a description of the dynamics in the corresponding differential system. Furthermore, the results permit the block-diagram representation of the differential system in FIG. 17, where, as in FIG. 16, the linear and nonlinear subsystems are compartmentalized using F(•,•) and $\tilde{g}$, respectively.

A sufficient synchronization condition for the inverter system in FIG. 15 is given. Corollary 1 is the network of N inverters in FIG. 15 synchronizes in the sense of (79), if $$\max_{\omega \in \square} \left\| \frac{\kappa^{-1} z_{net}(j\omega) z_{osc}(j\omega)}{\kappa^{-1} z_{net}(j\omega) + z_{osc}(j\omega)} \right\|_2 \sigma < 1. \quad (83)$$

The synchronization condition in (83) is similar to the condition given in (68). A difference is that the impedance, $z_{net}$, is scaled by $\kappa^{-1}$. As before, the synchronization condition is independent of the number of inverters and the load parameters.

A system and method for control design is described. A set of guidelines for parameter selection is also presented. In addition, a technique which facilitates the addition of inverters in an energized system is described. Because the synchronization condition is independent of N and the load parameters, for explanation purposes the task of system design is reduced to that of one inverter and its associated control. An inverter is provided which has a given filter impedance, z net, and power rating, $P_{max}$. Furthermore, a system frequency rating, $\omega_o$, is given. The peak load voltage is allowed to deviate between upper and lower limits, $v_{max}$ and $v_{min}$, respectively. Also, $v_{pk}$ denotes the peak value of v load in steady-state conditions.

The virtual oscillator parameters R, L, C, $\sigma$, $\phi$, $\kappa_v$, and $\kappa_i$ are selected such that $$\begin{cases} \frac{1}{\sqrt{LC}} = \omega_o \\ \sigma > \frac{1}{R} \\ v_{pk} = v_{max} \text{ under no-load conditions} \\ v_{pk} = v_{min} \text{ under maximum rated load conditions, } P_{max} \\ \dot{o} = \sqrt{\frac{L}{C}}\left(\sigma - \frac{1}{R}\right) \text{ is minimized} \\ \sup_{\omega \in \square} \left\| \frac{\kappa^{-1} z_{net}(j\omega) z_{osc}(j\omega)}{\kappa^{-1} z_{net}(j\omega) + z_{osc}(j\omega)} \right\|_2 \sigma < 1 \end{cases} \quad (84)$$

Stated another way, the objectives ensure: a) the inverters oscillate at $\omega_o$. b) voltage limits are respected such that $v_{min} \leq v_{pk} \leq v_{max}$ across the entire load range (no-load to maximum rated load). C) the distortion on the sinusoidal output is reduced, and d) the synchronization condition is satisfied.

Figure 18:
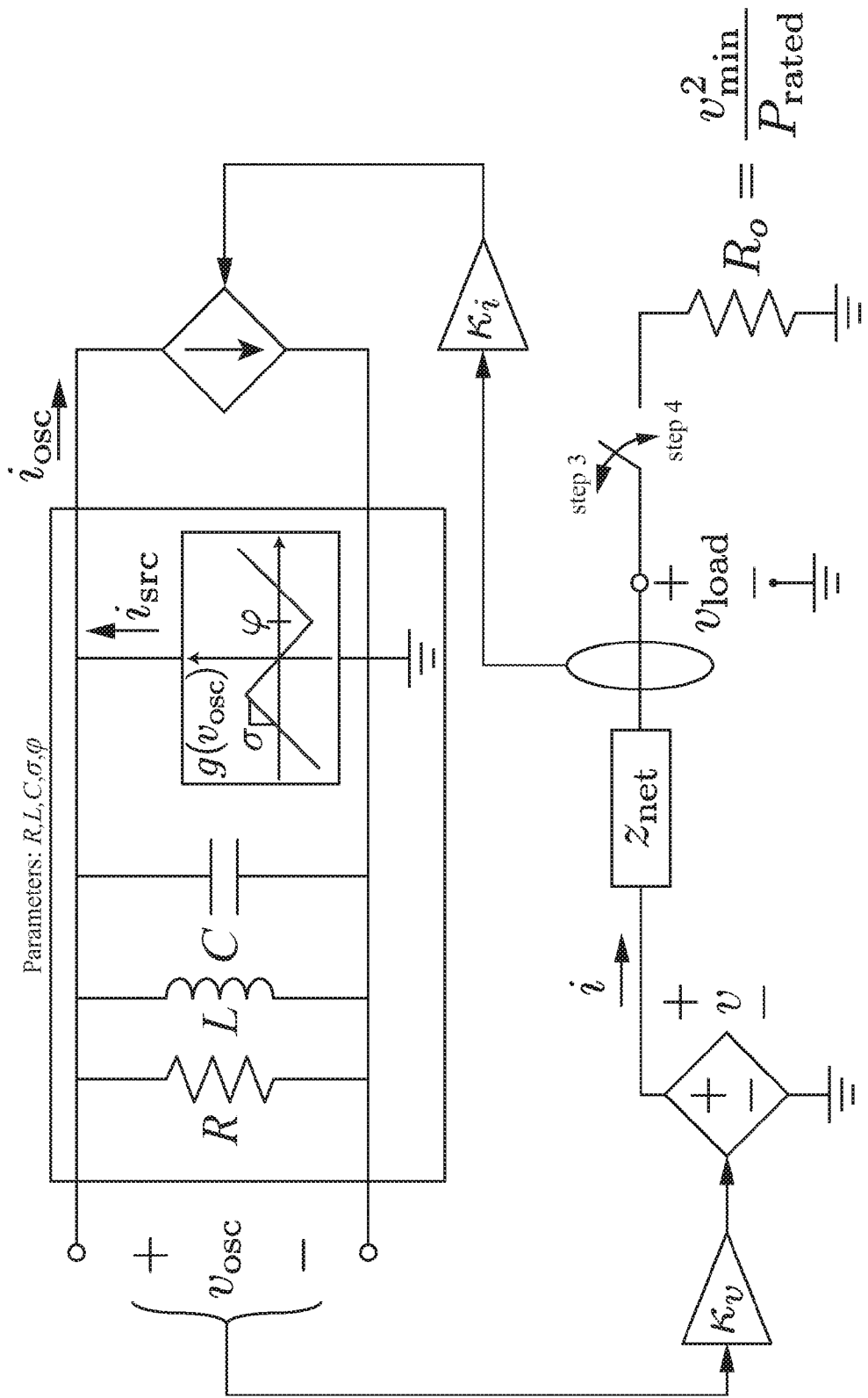
FIG. 18 is a circuit model used in control parameter selection.

FIG. 18 is a circuit model used in control parameter selection. Given the nonlinear nature of the system and lack of analytical tools for the deadzone oscillator, an iterative design process is shown. In steps 3 and 4, the analyst simulate the model until steady-state conditions are reached. In step 2, the parameters R and C are selected such that the individual inverter has a stable oscillation at the rated system frequency. The constraint $$\sigma > \frac{1}{R}$$

ensures that a stable oscillation exists, and the relation $$\omega_o = \frac{1}{\sqrt{LC}}$$

guarantees that the circuit oscillates at the rated frequency, $\omega_o$. Steps 3 and 4, which utilize a time-domain simulation of the model in FIG. 18, are motivated by the amplitude of v load decreasing as the real power consumed in the load increases. Consequently, the maximum and minimum load voltages correspond to the no load and full-rated load cases, respectively. Once steps 3 and 4 are complete, then $v_{min} \leq v_{pk} \leq v_{max}$ can be satisfied across the entire rated load range. If the synchronization condition is satisfied, a system of N inverters with identical design parameters synchronizes.

Figure 19:
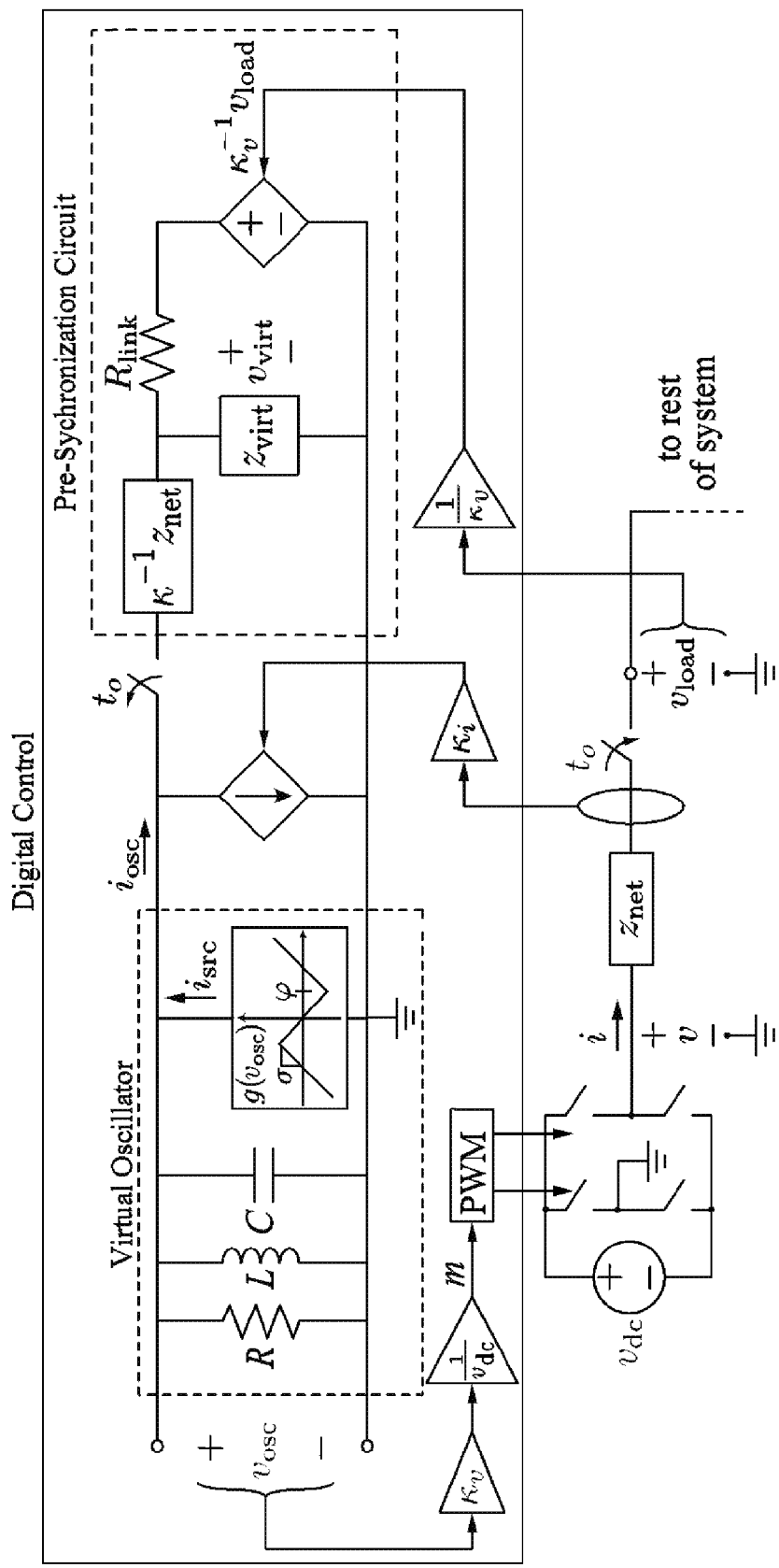
FIG. 19 is a circuit diagram of an exemplary inverter controller with a pre-synchronization circuit.

FIG. 19 is a circuit diagram of an exemplary inverter controller with a pre-synchronization circuit. A condition for global asymptotic synchronization is independent of N and the load parameters. As the number of inverters changes, the system can synchronize. If the synchronization condition is satisfied, inverters can be added and removed as needed and the system synchronizes in the steady-state. Despite this favorable property, it is possible that system transients can be undesirably large when inverters are added. To facilitate a seamless addition of inverter units and avoid hardware damage due to large transients, a pre-synchronization circuit is added.

For $t<t_o$, there are N inverters operating in a microgrid with a load. At $t=t_o$, an additional inverter or multiple inverters are added to the system. The additional inverter is capable of measuring the common node voltage, $v_{load}$, prior to being added. As shown in FIG. 19, for $t<t_o$ the virtual oscillator of the inverter to be added can be augmented with a pre-synchronization circuit which includes: i) a scaled filter impedance, $\kappa^{-1} z_{net}$, ii) a virtual load, $z_{virt}$, and iii) a voltage source which follows $v_{load}$ and is interfaced through a series resistor, $R_{link}$. Before the additional inverter is connected to the system, it is assumed that the N operational inverters are synchronized and in steady-state. A purpose of the pre-synchronization circuit is to bring the state-variables of the additional inverter controller as close as possible to synchronization with the operational inverter controllers before being added to the system.

The pre-synchronization control in FIG. 19 is allowed to reach steady-state before the inverter is added to the system at $t=t_o$. During steady-state conditions: i) if the virtual load is chosen such that $z_{virt} \approx \kappa^{-1} N z_{load}$, then the virtual oscillator state variables in the additional unit closely match that of the operational inverter controllers, and ii) $v_{virt} \approx \kappa_v^{-1} v_{load}$, where $v_{virt}$ is the voltage across the virtual load and $v_{load}$ is load voltage in the energized system. During these conditions, inverters can be added with minimal system transients.

When the inverter is added at t=$t_o$, the pre-synchronization circuit is removed and the original virtual oscillator control remains.

Figure 20:
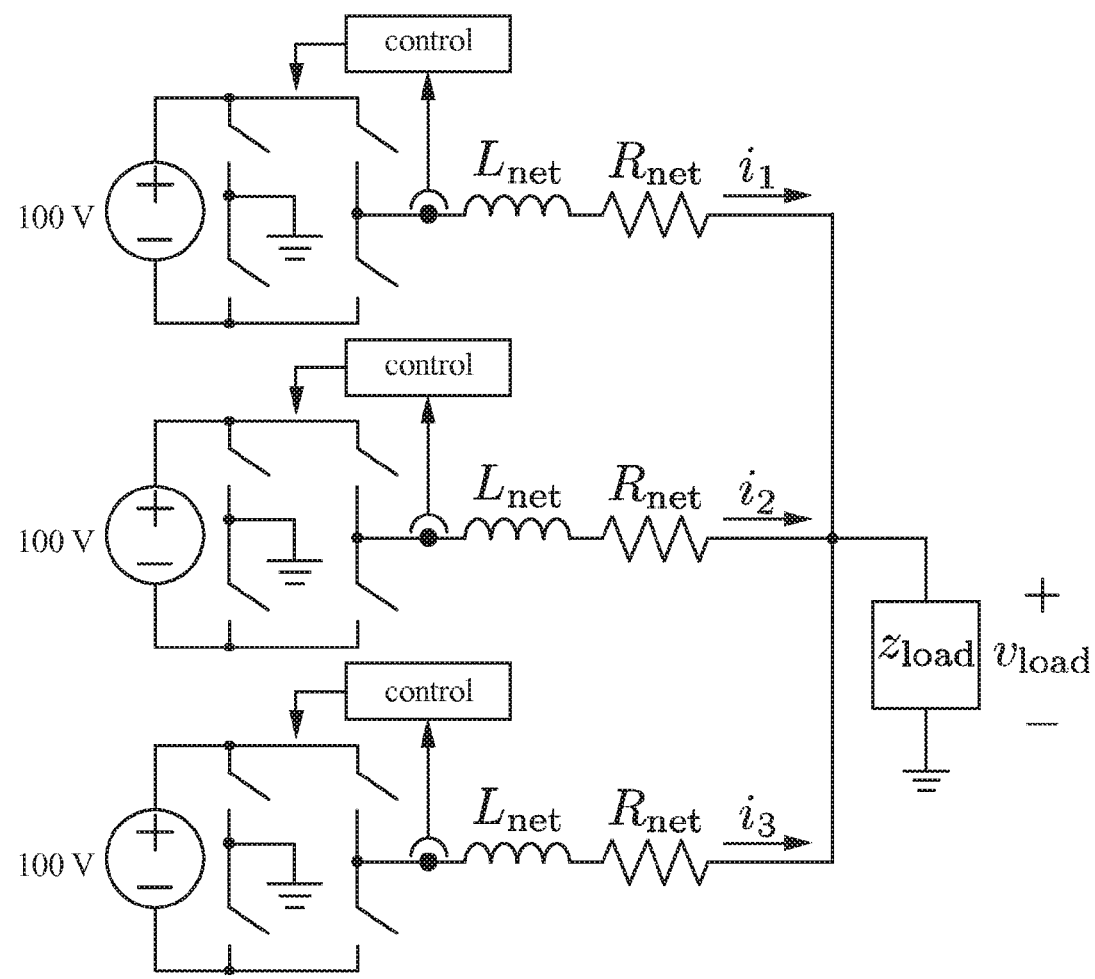
FIG. 20 is a circuit diagram of an exemplary inverter system.

FIG. 20 is a circuit diagram of an exemplary inverter system. Three single-phase H-bridge inverters and accompanying control can be configured to deliver power to a load. The inverters are interfaced to a common node through branch impedances $z_{net}(s)=sL_f+R_f$. The filter inductance is denoted as $L_f$ and the combined resistance of the inductor windings, connectors, and conductors is lumped into $R_f$. For explanation purposes, the inverters are rated to deliver approximately 50 W and has a 100 V dc source at the input. For illustrative purposes, the controllers were implemented on a Texas Instruments TMS320F28335 microcontroller and each inverter can utilize an independent control loop.

TABLE 2

Exemplary control and hardware parameters:

System parameters

| | |
|---|---|
| $\omega_0 = 2\pi\,60^{\,rad}$ | $\sigma = 1$ S |
| $v_{rated} = 60\sqrt{2}$ V | R = 10 Ω |
| $v_{max} = 1.05\,v_{rated}$ | L = 500 μH |
| $v_{min} = 0.95\,v_{rated}$ | $C = \dfrac{1}{L\omega_o^2} \approx 14.07$ mF |
| $K_v = 60\sqrt{2}$ | $\phi = 0.4695$ V |
| $K_i = 0.1125$ | $\epsilon = 0.170$ |
| $z_{virt} = 2\,\kappa^{-1}\,57.5$ Ω | $R_f = 1$ Ω |
| $R_{link} = \kappa^{-1}\,100$ Ω | $L_f = 6$ mH |

For the system structure in FIG. 20, the linear fractional transformation is given by $$F(z_{osc}(s), \kappa z_{net}^{-1}(s)) = \frac{\kappa^{-1}z_{net}(j\omega)z_{osc}(j\omega)}{\kappa^{-1}z_{net}(j\omega)+z_{osc}(j\omega)} \quad (85)$$

$$= \frac{\frac{1}{C}s}{s^2 + \frac{1}{RC}s + \frac{1}{LC} + \frac{s}{C}\kappa(L_f s + R_f)^{-1}}$$

$$= \frac{(L_{net}s + R_{net})s}{L_{net}Cs^3 + \left(\frac{L_{net}}{R} + R_{net}C\right)s^2 + \left(\frac{L_{net}}{L} + \frac{R_{net}}{R} + \kappa\right)s + \frac{R_{net}}{L}}.$$

The peak voltage and frequency ratings of the system are $60\sqrt{2}$ V and 60 Hz, respectively. The parameters in Table 2 were selected such that the load voltage stayed within ±5% of the rated value across the load range (no-load to maximum rated load). Substituting the corresponding values in Table 2 into (85), $\|F(z_{osc}(j\omega),\kappa z_{net}^{-1}(j\omega)\|_\infty \sigma=0.93<1$. Therefore, synchronization of the inverter system is guaranteed. The inverter system can be connected to a variety of loads. The synchronization condition can be used for passive linear loads and mechanical loads. System startup and load transients can be considered in addition to inverter removal and addition dynamics.

Figure 21:
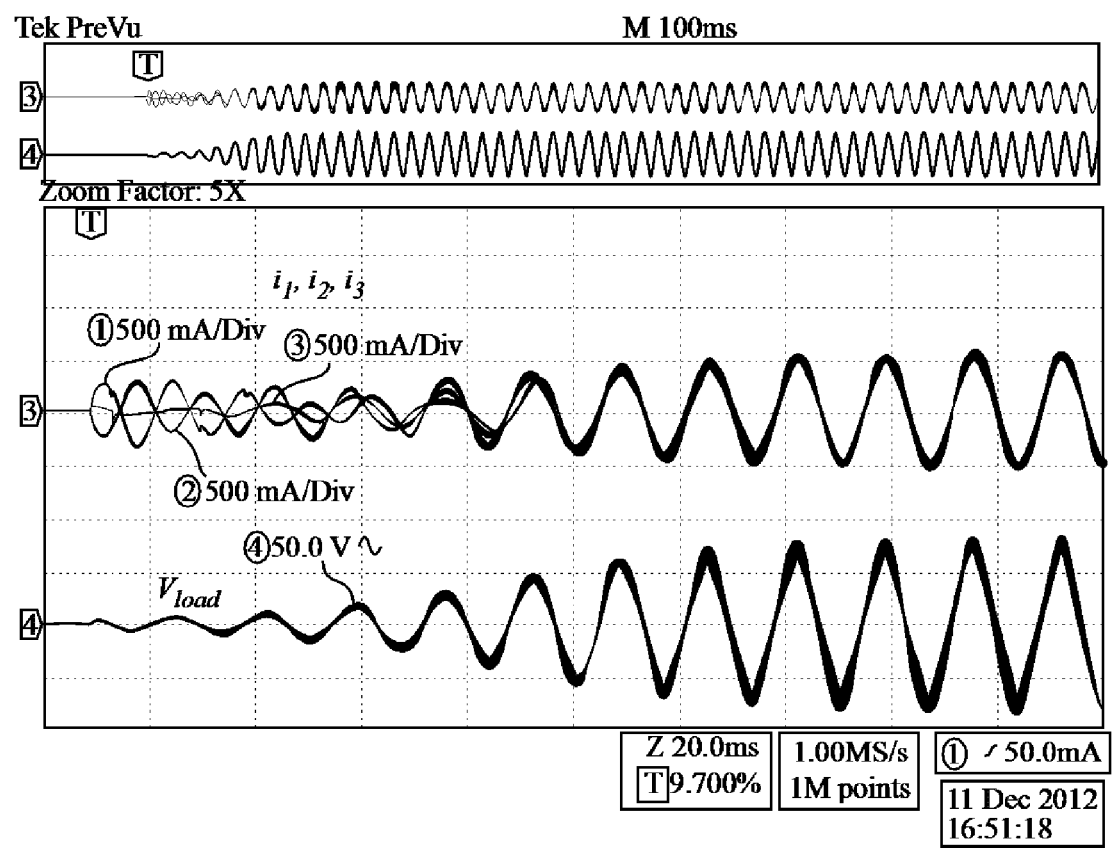
FIG. 21 is an oscilloscope screenshot of exemplary measured inverter output currents and load voltage during system startup with a resistive load.

FIG. 21 is an oscilloscope screenshot of exemplary measured inverter output currents and load voltage during system startup with a resistive load. In the oscilloscope screenshots, the top three waveforms can correspond to the measured inverter currents and the bottom waveform is the load voltage. To mimic non-ideal startup conditions, the virtual oscillator voltages were initialized such that $\kappa_v\,v_{osc}(0)=v(0)=[5V,\,4V,\,3V]^T$ for each of the respective inverter controllers. FIG. 21 shows the system currents and load voltages during start-up in the presence of a 50Ω load. In this example, $R_{load}$ undergoes step changes between 500Ω and 71.4Ω.

Figure 22A:
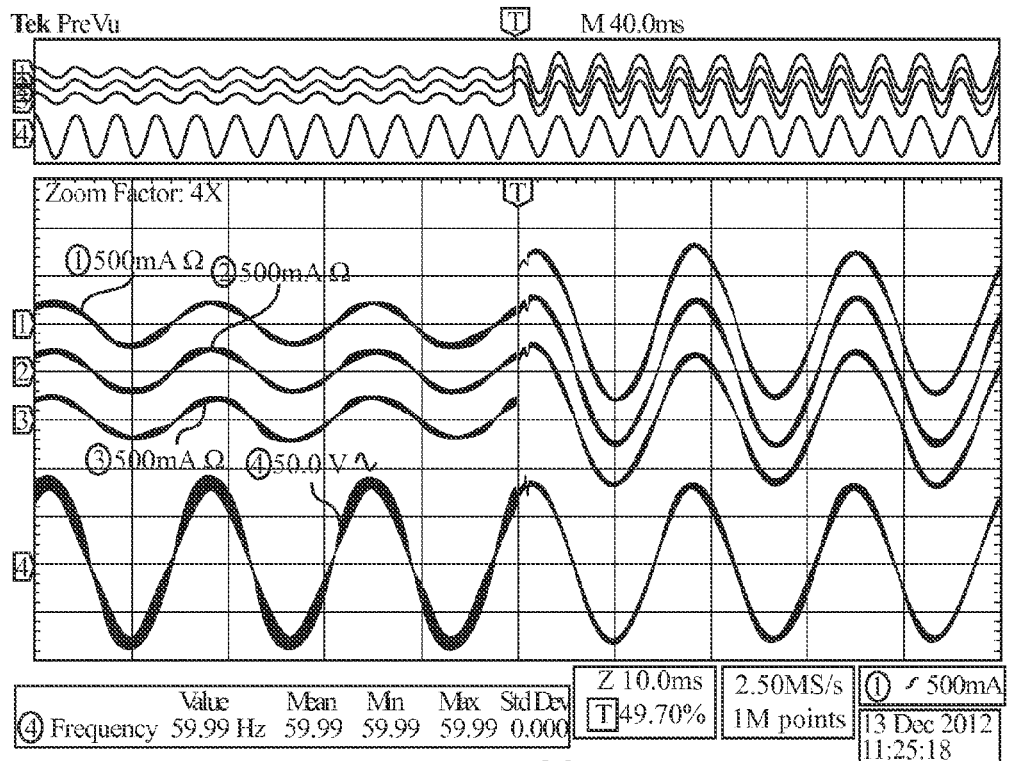
FIGS. 22A and 22B are oscilloscope screenshots of resistive load transients showing exemplary inverter output currents and load voltage during (a) load step-up and (b) load step-down.
Figure 22B:
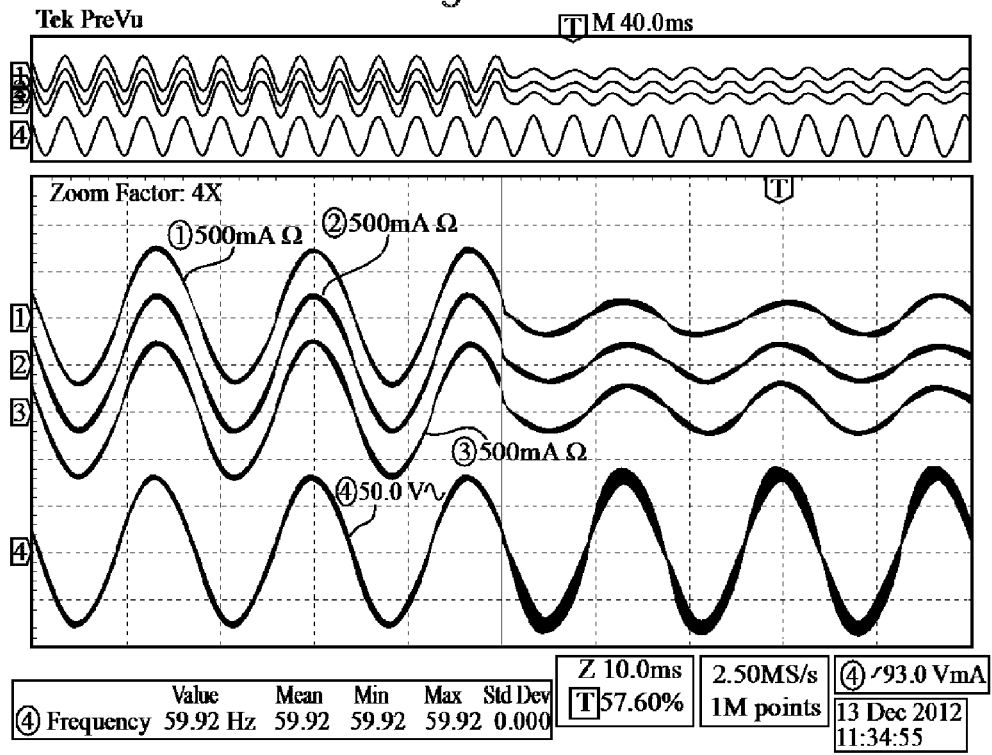

FIGS. 22(*a*) and 22(*b*) are oscilloscope screenshots of resistive load transients showing exemplary inverter output currents and load voltage during (a) load step-up and (b) load step-down. The inverters increase and decrease their output currents almost instantaneously as the load power changes. Furthermore, the load voltage amplitude remains nearly constant during transients.

Figure 23A:
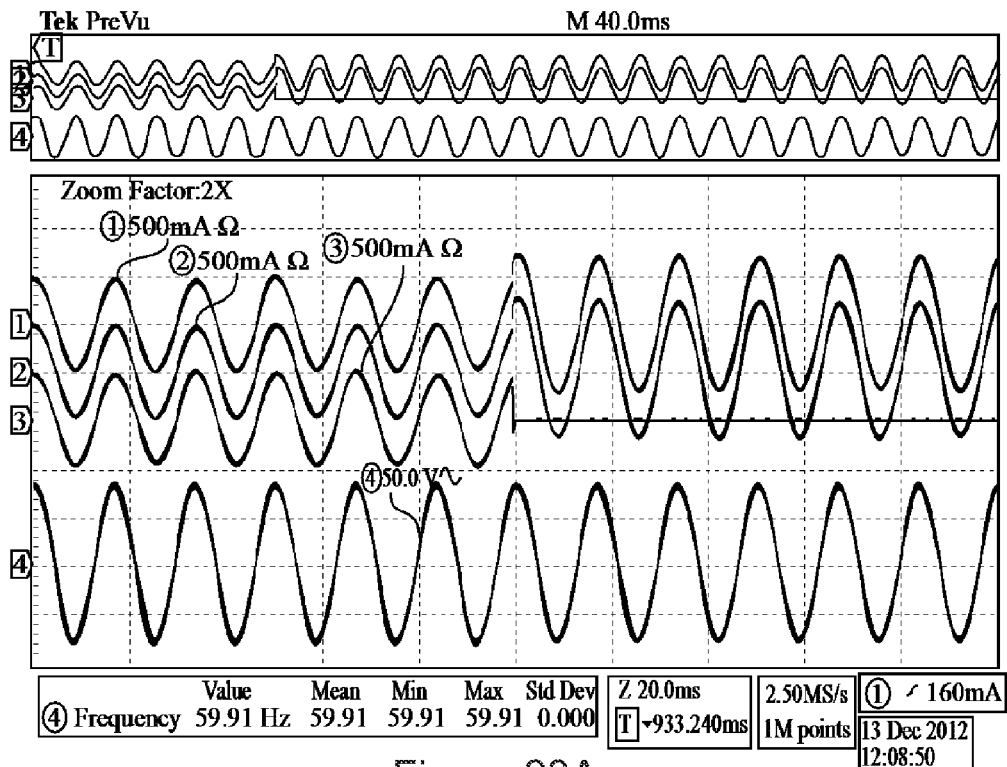
FIGS. 23A and 23B are oscilloscope screenshots of inverter output currents and load voltage when an inverter is (a) removed and (b) added in the presence of a resistive load.
Figure 23B:
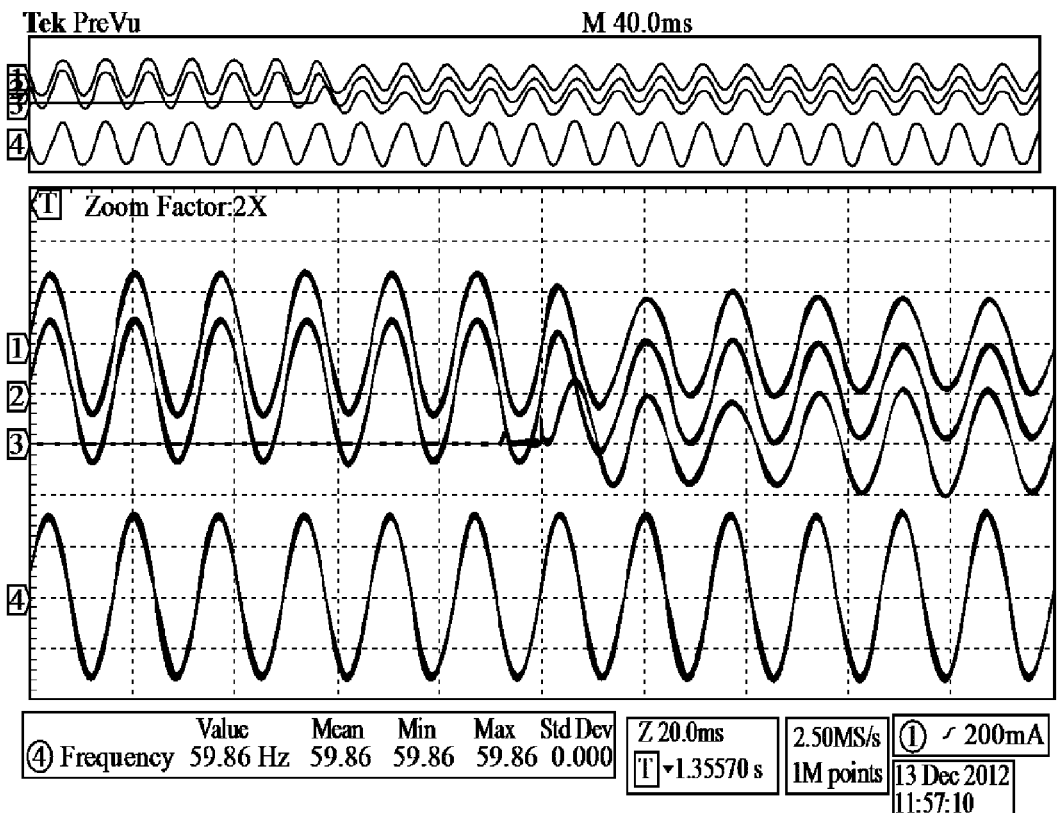

FIGS. 23(*a*) and 23(*b*) are oscilloscope screenshots of inverter output currents and load voltage when an inverter is (a) removed and (b) added in the presence of a resistive load. In the case when the number of inverters in the microgrid undergoes a change, system dynamics during inverter removal and addition are shown in FIGS. 23(*a*) and 23(*b*), respectively. In both transients, $R_{load}$=66Ω. During inverter removal, the remaining units quickly compensate by increasing their output currents. The pre-synchronization technique, with parameters as summarized in Table 2 is implemented before adding inverter #3 back into the system. As demonstrated in FIG. 23(*b*), system transients are relatively small during unit addition. Furthermore, the load voltage waveform is largely unaffected during both inverter removal and addition transients.

FIGS. 24(*a*) and 24(*b*) are circuit diagrams of exemplary circuits for (a) linear RLC load and (b) nonlinear diode bridge rectifier load. System start-up is demonstrated when the switch in the RLC load is closed. The virtual oscillators associated with each inverter were initialized such that $v(0)=[5\,V,\,4\,V,\,3\,V]^T$.

FIG. 25 is an oscilloscope screenshot of exemplary measured inverter output currents and load voltage during system startup with an RLC load. System dynamics in FIG. 25 show successful synchronization.

Figure 26A:
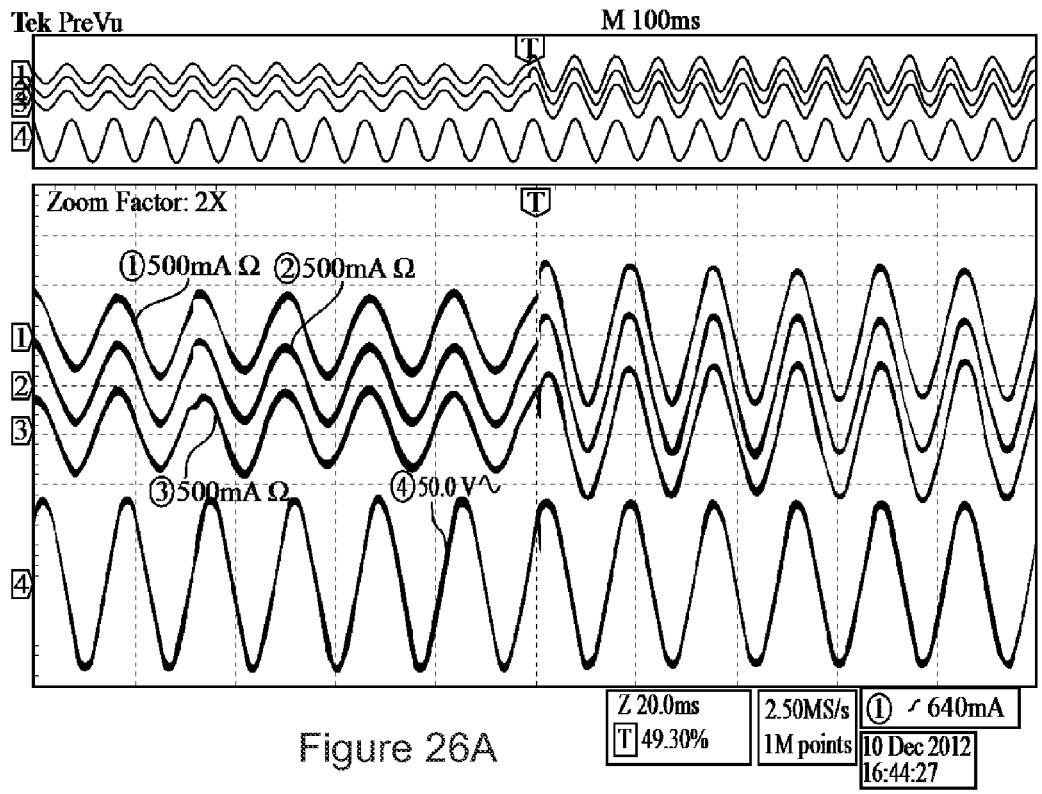
FIGS. 26A and 26B are oscilloscope screenshots of RLC load transient showing inverter output currents and load voltage when RL load branch is (a) added and (b) removed.
Figure 26B:
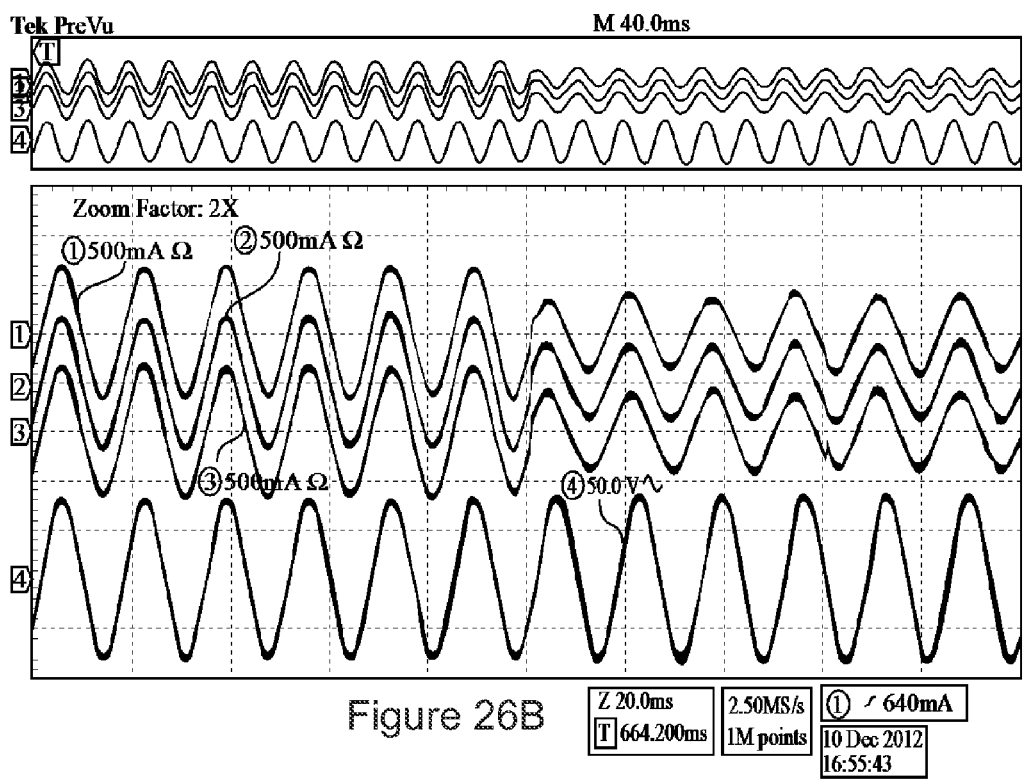

Consider load transients in the RLC load where the switch in FIG. 24(*a*) is opened and closed. FIGS. 26(*a*) and 26(*b*) are oscilloscope screenshots of RLC load transient showing inverter output currents and load voltage when the RL load branch is (a) added and (b) removed. The system dynamics in FIGS. 26(*a*) and 26(*b*) correspond to the opening and closing of the switch which interfaces the RL branch of the load, respectively.

Figure 27:
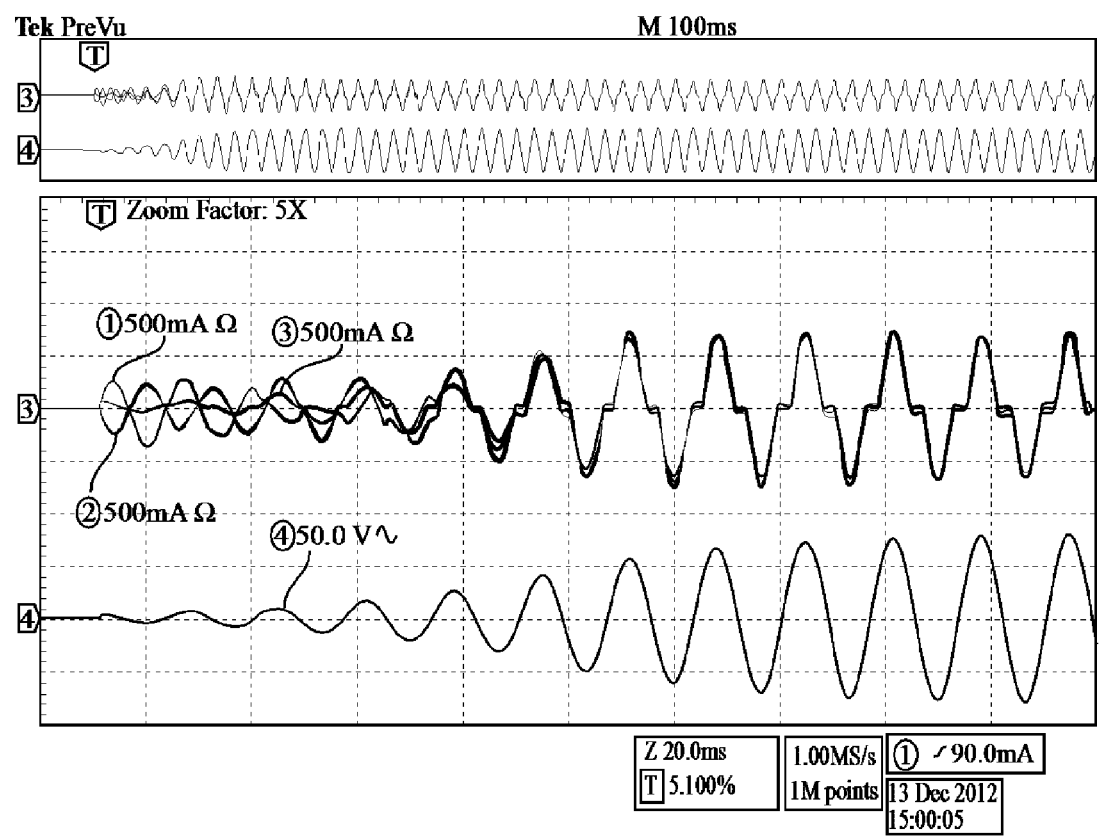
FIG. 27 is an oscilloscope screenshot of exemplary measured inverter output currents and load voltage in the presence of a diode bridge rectifier load.

FIG. 27 is an oscilloscope screenshot of exemplary measured inverter output currents and load voltage in the presence of a diode bridge rectifier load. The system is configured to deliver power to the nonlinear load in FIG. 24(*b*). Example evidence is presented which shows that the control is compatible with nonlinear loads. The inverter controllers are initialized with non-uniform initial conditions as in the previous two examples. As demonstrated in FIG. 27, the system of inverters successfully synchronizes and delivers power to the load.

Figure 28A:
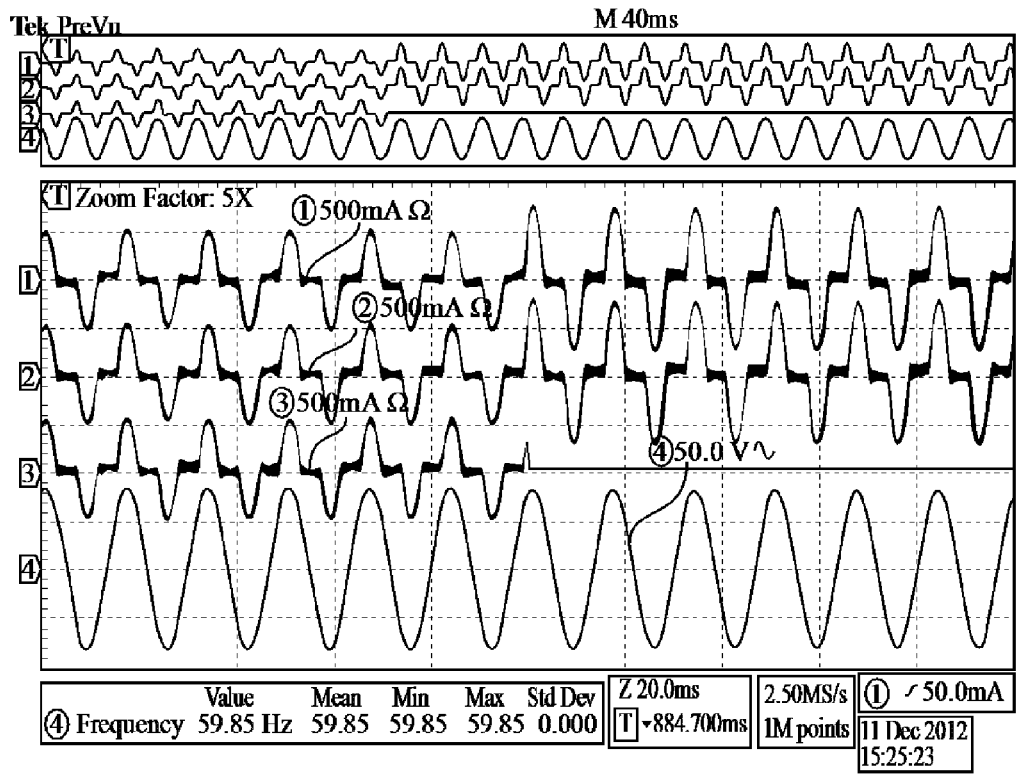
FIGS. 28A and 28B are oscilloscope screenshots of inverter output currents and load voltage when connected to a diode bridge rectifier load and an inverter is (a) removed and (b) added.
Figure 28B:
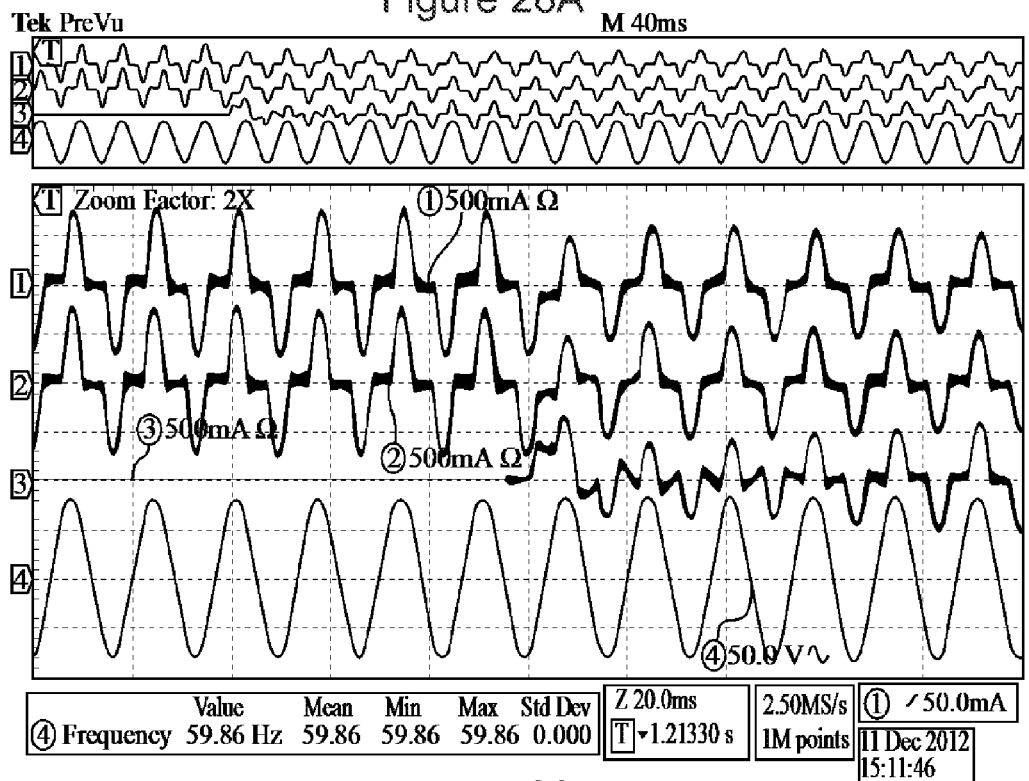

FIGS. 28(*a*) and 28(*b*) are oscilloscope screenshots of inverter output currents and load voltage when connected to a diode bridge rectifier load and an inverter is (a) removed and (b) added. In this example, the number of parallel inverters connected to the nonlinear load can undergo changes. As illustrated in FIG. 28(*a*), the remaining inverters maintain synchronization and deliver power to the load when one inverter is removed. The pre-synchronization circuit parameters in Table 2 have been used such that $z_{virt}=2\kappa^{-1}57.5Ω$ and $R_{link}=\kappa^{-1}100Ω$. The inverter addition transient in FIG. 28(*b*) is relatively small. Seamless unit addition can result despite the fact that the actual load is nonlinear and the pre-synchronization virtual load is purely resistive. This can imply that performance during unit addition is not particularly sensitive to the accuracy of the following approximation: choose $z_{virt} \approx \kappa^{-1} N z_{load}$.

In these examples, the inverter system is delivering power to a pair of parallel-connected single-phase fans. Each mechanical load is rated for 120 V AC operation and the power ratings of each fan were 80 W and 260 W. Because an induction machine contains a back electromotive force voltage, the fan is not a passive LTI load. Consequently, the synchronization condition does not apply. However, it can be shown that the inverter control still retains the desired performance.

Figure 29:
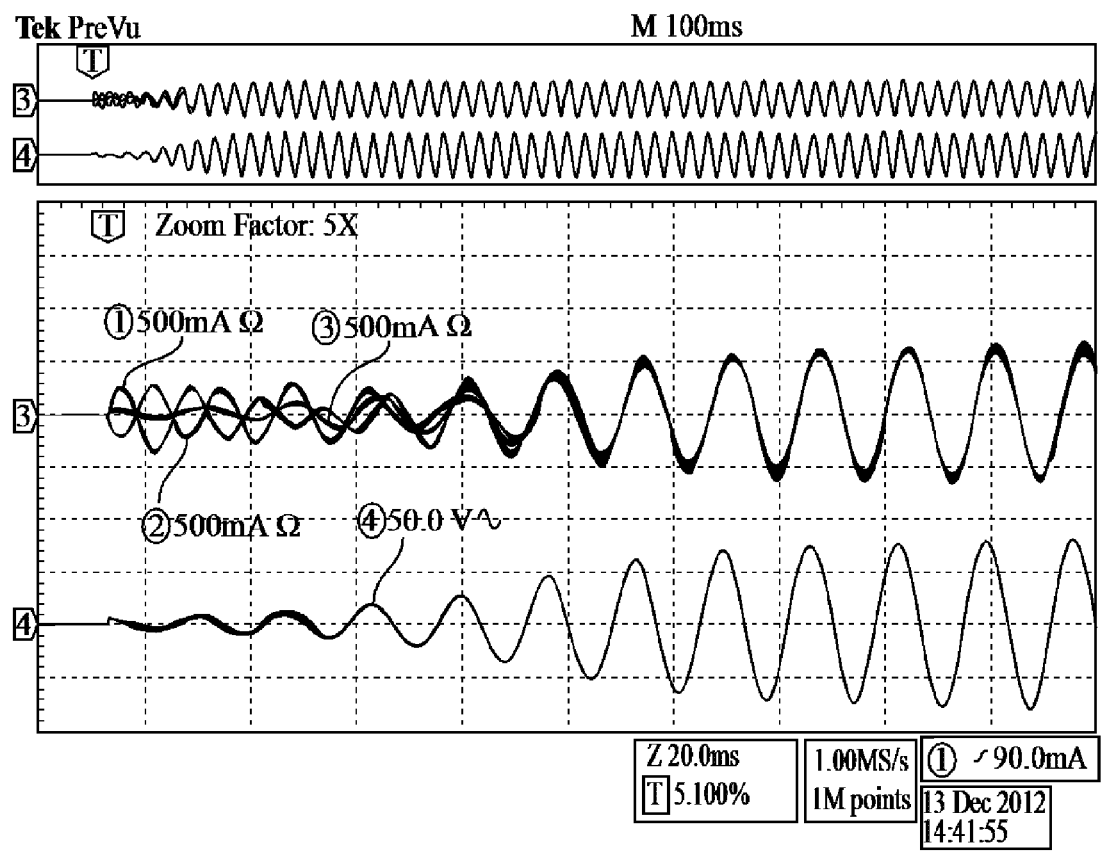
FIG. 29 is an oscilloscope screenshot of exemplary measured inverter output currents and load voltage in the presence of two fan loads.

FIG. 29 is an oscilloscope screenshot of exemplary measured inverter output currents and load voltage in the presence of a two parallel fan loads. Reusing previously stated initial conditions, the startup performance of the inverter system can be seen in FIG. 29. Results indicate that the inverters successfully synchronize and deliver power to the mechanical load.

Figure 30A:
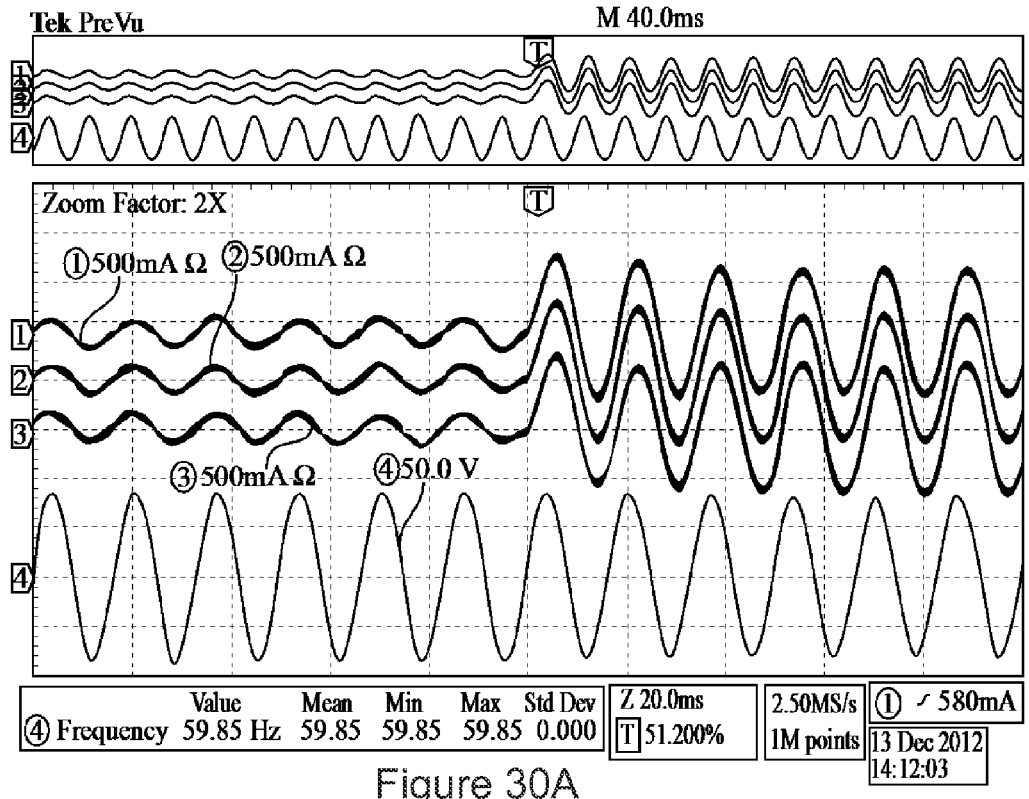
FIGS. 30A and 30B are oscilloscope screenshots of mechanical load transients showing inverter output currents and load voltage during load (a) step-up and (b) load step-down.
Figure 30B:
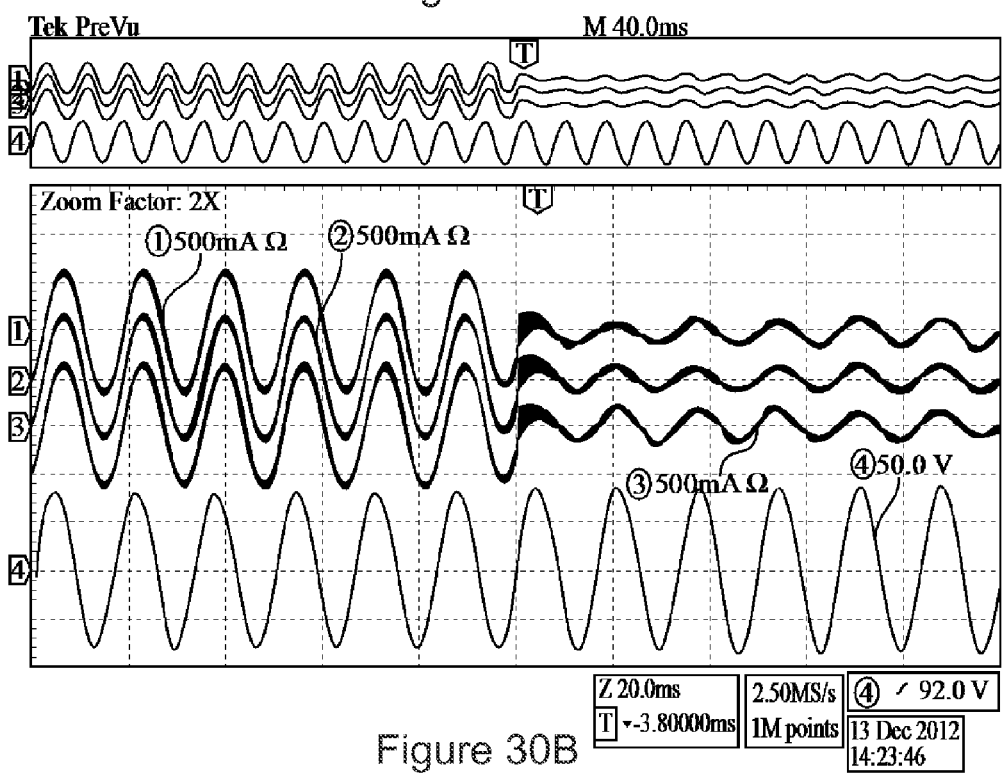

FIGS. 30(a) and 30(b) are oscilloscope screenshots of mechanical load transients showing inverter output currents and load voltage during load (a) step-up and (b) load step-down. In this example, the power consumed by the mechanical load is abruptly increased and decreased. FIGS. 30(a) and 30(b) illustrate system dynamics during a step-up and step-down in load power, respectively.

Figure 31:
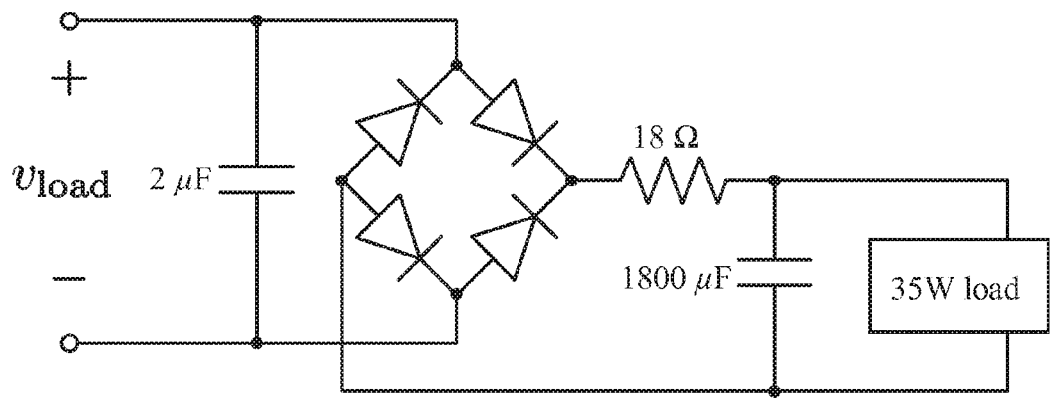
FIG. 31 is a circuit diagram of an exemplary single-phase, constant power load.

FIG. 31 is a circuit diagram of an exemplary single-phase, constant power load. A simulation is conducted of a system of inverters which are configured to deliver power to a constant power load. An average value simulation of the inverter system described above is utilized. All control parameters and initial conditions are reused for consistency. As shown in FIG. 31, the load includes a diode bridge rectifier and a 35 W constant power load on the dc side. The system of three inverters was allowed to synchronize and then the load was abruptly activated at approximately 0.16 s.

Figure 32:
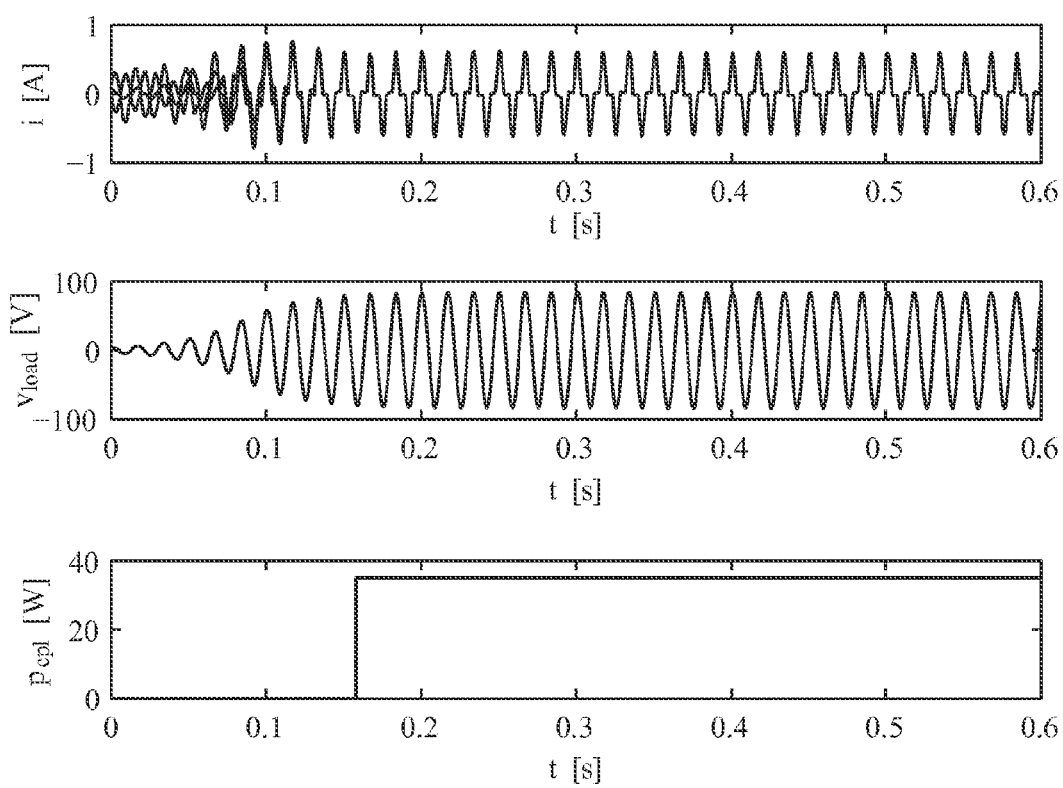
FIG. 32 is an oscilloscope screenshot of exemplary simulated inverter currents, load voltage, and power consumed by the dc load.

FIG. 32 is an oscilloscope screenshot of exemplary simulated inverter currents, load voltage, and power consumed by the dc load. As illustrated, the system of inverters successfully delivers power to the load and maintains synchronization. The dc load power is denoted as $p_{cpl}$.

Therefore, a practical method for the implementation of virtual oscillator control is described. After giving the synchronization condition for a hardware system of parallel inverters, a design procedure was described. Furthermore, a method for seamlessly adding inverters into an energized microgrid was described. Example results were used to demonstrate the merit of the techniques. Results demonstrate rapid system response to transients and synchronization despite non-ideal initial conditions. Seamless addition of inverters into the energized system can be achieved with the pre-synchronization method. Although the synchronization condition has been proven valid for linear loads, hardware results indicate that the control performs as desired with a variety of load types. Control for systems of inverters with non-identical power ratings can be implemented.

Figure 33:
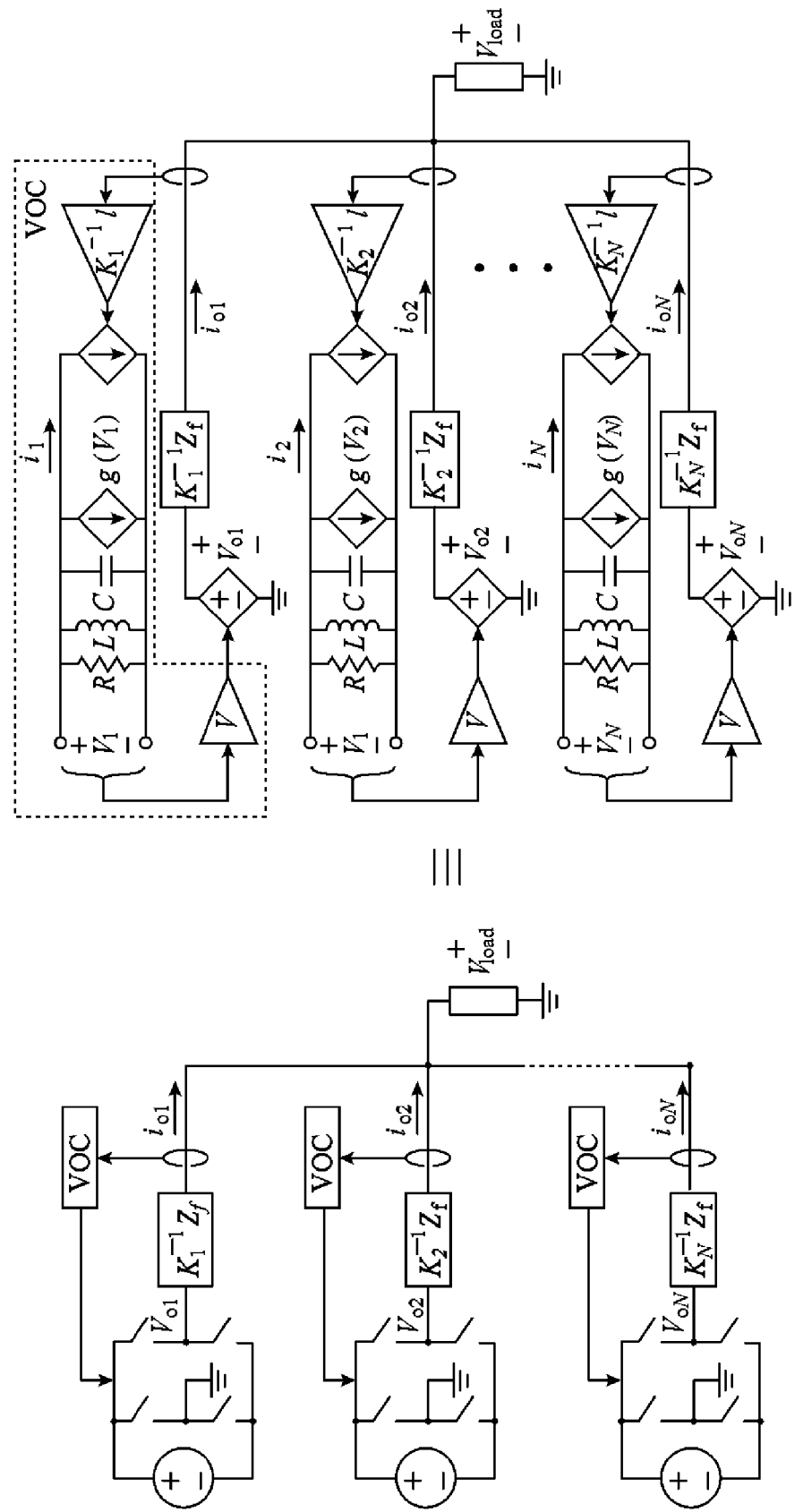
FIG. 33 is a circuit diagram of an exemplary system of inverters with virtual oscillator control in (a) and exemplary system of coupled oscillators in (b).

FIG. 33 is a circuit diagram of an exemplary system of inverters with virtual oscillator control in (a) and exemplary system of coupled oscillators in (b). FIG. 33 illustrates how inverters of heterogeneous power ratings can be accommodated. the power rating of the $j^{th}$ inverter is denoted by $P_j$. The impedance of the $j^{th}$ output filter will be written as $\kappa_j^{-1} z_j(s)$, where $z_j(s)$ is defined as the reference filter impedance. The former definitions allow us to establish a base impedance, $z_{basej} = V_{rated}^2/P_j$, such that the per-unitized $j^{th}$ filter impedance is equal to $z_j(s)/(\kappa_j z_{basej})$. By selecting the per-unit filter impedance of each inverter to be identical, it is straightforward to show that $$\frac{P_j}{\kappa_j} = \frac{P_k}{\kappa_k},$$

$\forall j,k=1, \ldots, N$. Hence, current sharing between multiple inverters in proportion to their power ratings is achieved choosing the inverter filters to have the same per-unit impedance and by incorporating the value of $\kappa_j$ into the current scaling as shown in FIG. 33.

Figure 34:
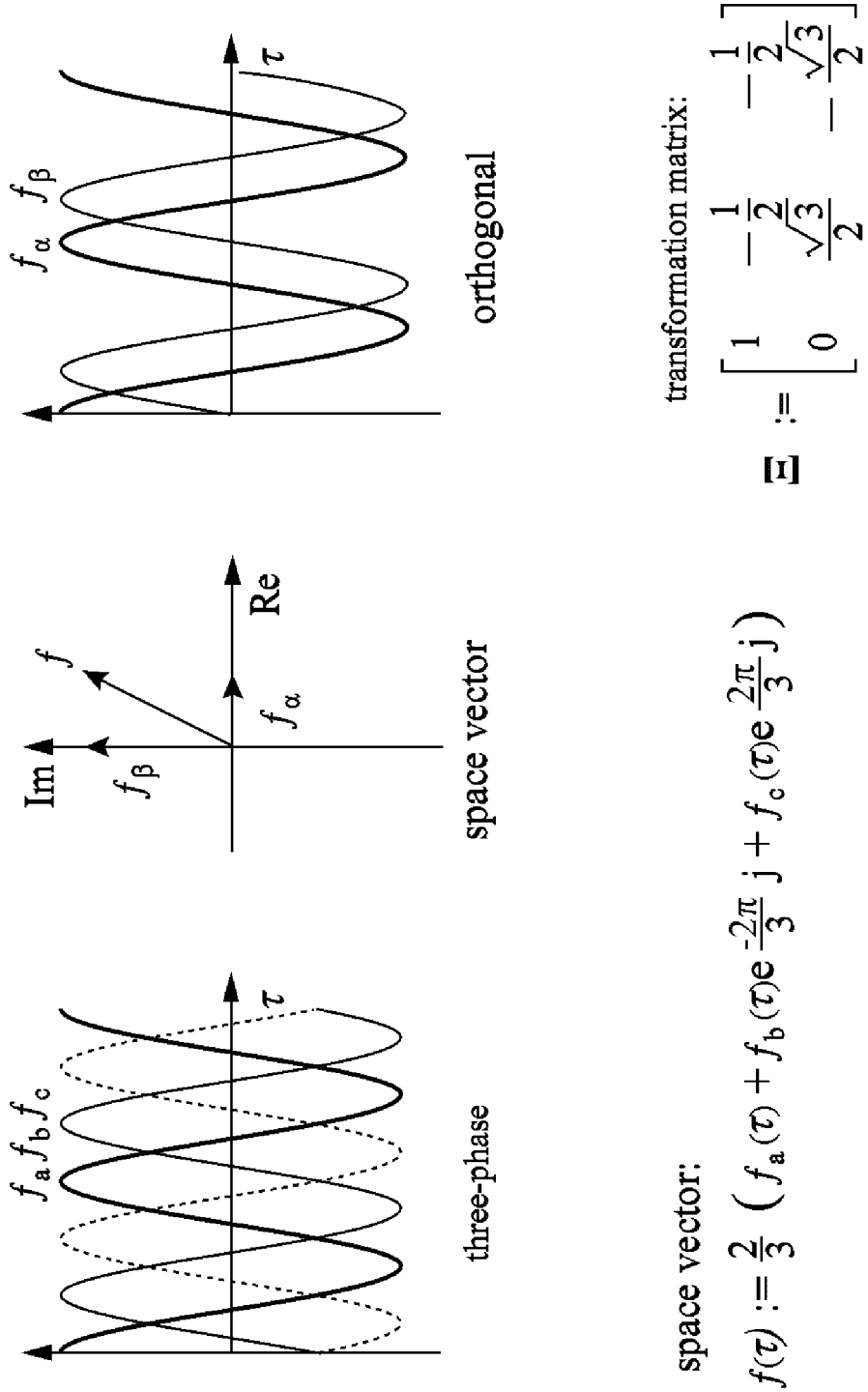
FIGS. 34 and 35 are phase diagrams of an exemplary coordinate transformation of three-phase signals.
Figure 35:
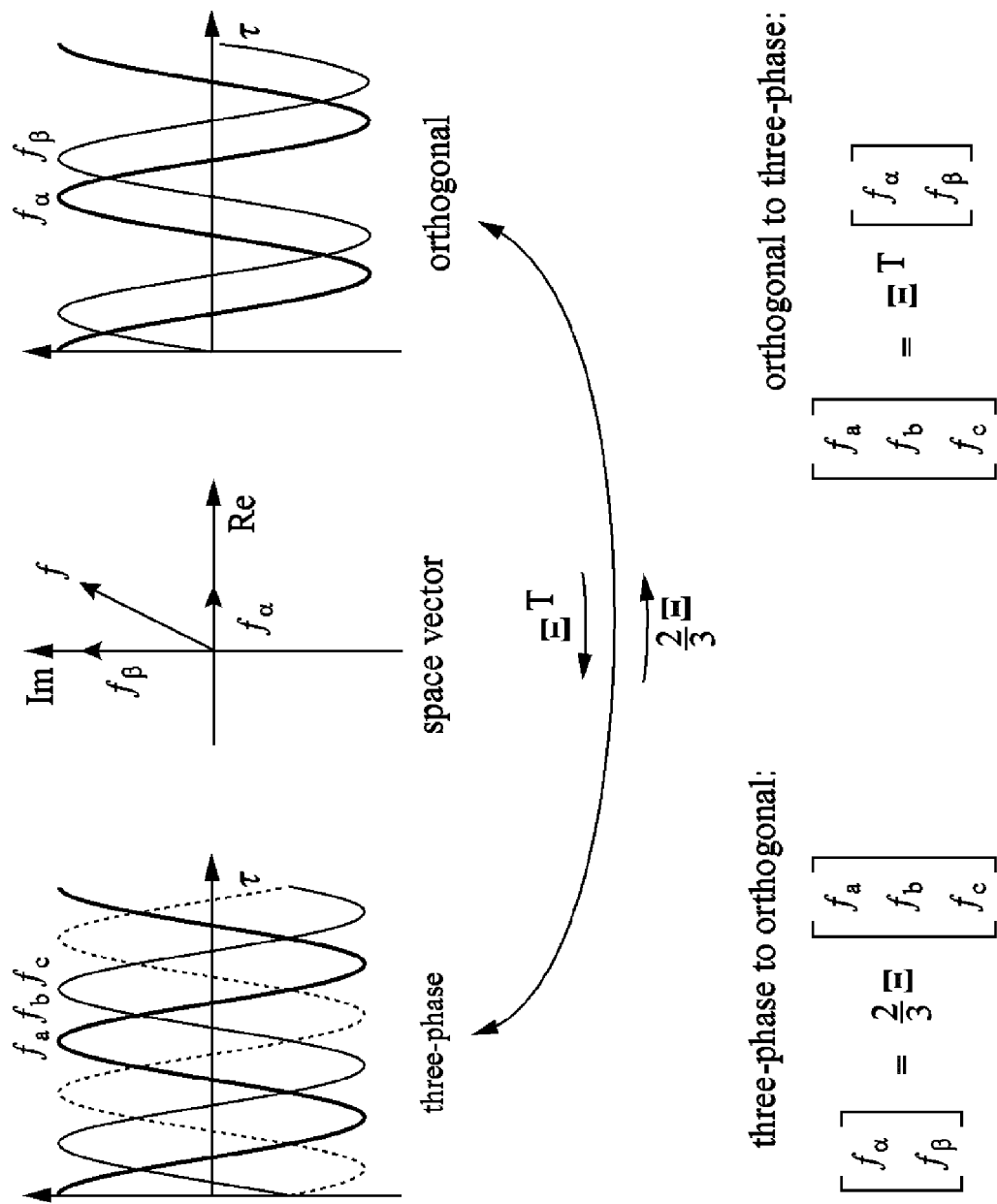

FIGS. 34 and 35 are phase diagrams of an exemplary coordinate transformation of three-phase signals. FIGS. 34 and 35 show (a) three-phase balanced waveforms, (b) space-vector signal in the complex plane, and (c) corresponding waveforms in the $\alpha\beta$-frame. The coordinate transformation can be used in a controller in several ways. For example, the inverter output currents, $i_{abc}(t)=[i_a(t), i_b(t), i_c(t)]^T$, are sensed and transformed to obtain $i_\alpha(t)$ and $i_\beta(t)$ with the space vector. Since $i_a(t)=i_\alpha(t)$ under balanced conditions, the current $u_\alpha(t)$ is extracted from the virtual oscillator to establish the link with the single-phase equivalent of the three-phase inverter. To control the switching action of the three-phase inverter, a set of three-phase modulation signals is generated.

In the quasi harmonic regime, the oscillator terminal voltage can be approximated as $v_C(t)=V \cos(\omega t)$, where, the amplitude, V, is governed by the choice of σ and R, and the frequency $\omega \approx 1/\sqrt{LC}$. Since $di_L/dt=v_C$, it follows that the current through the inductor in the RLC subcircuit is given by $i_L(t)=V/(\omega L) \sin(\omega t)$. Since $v_C(t)$ and $i_L(t)$ are orthogonal, they can be used to derive a set of three-phase modulation signals. In particular, $v_C$ and $i_L$ are transformed from the $\alpha\beta$-frame to the abc-frame, multiplied by v, and scaled by the dc-link voltage to yield a set of three-phase modulation signals, $m_{abc}(t)=[m_a(t), m_b(t), m_c(t)]^T$. A pulse width modulation scheme can be used to generate the switching signals. The average inverter terminal voltages follow the commanded voltages, e.g., $v_{abc} \to v^*_{abc}$. With the approach, the controller state variables corresponding to the nonlinear oscillator (e.g., $v_C(t)$ and $i_L(t)$) are directly utilized to generate the three-phase modulation signals. This can eliminate a need for explicit orthogonal-signal generators.

Figure 36:
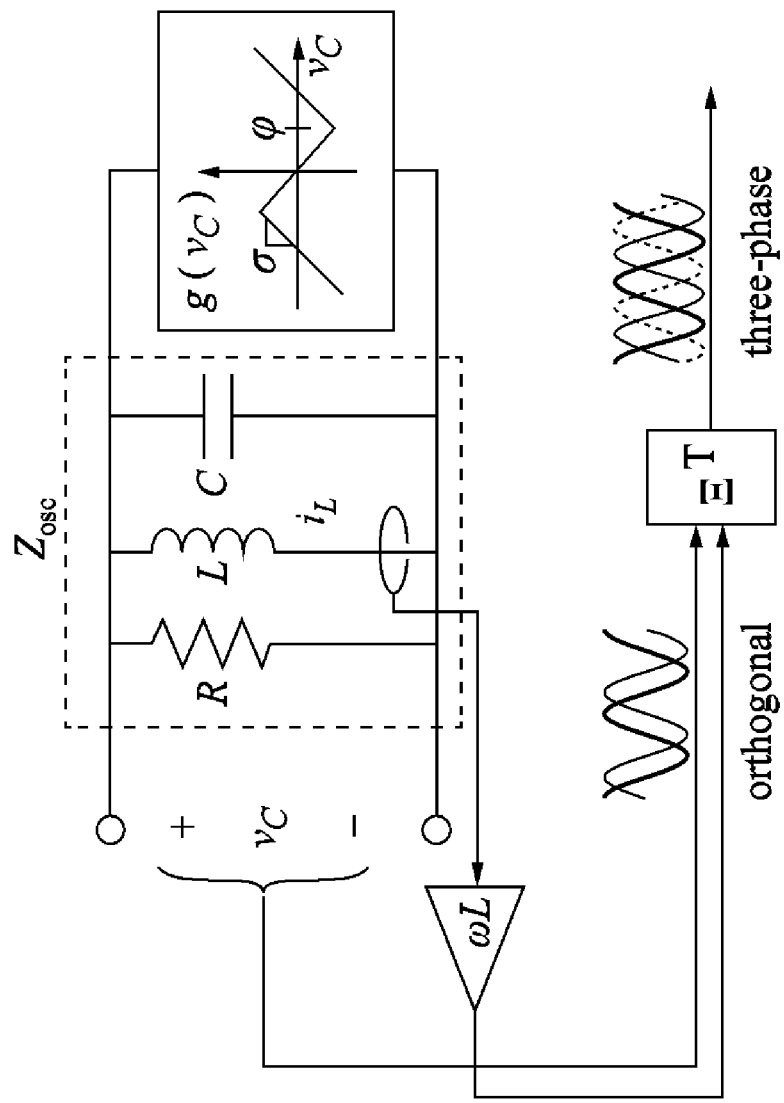
FIG. 36 is a circuit diagram of an exemplary deadzone oscillator for three-phase signals.
Figure 37:
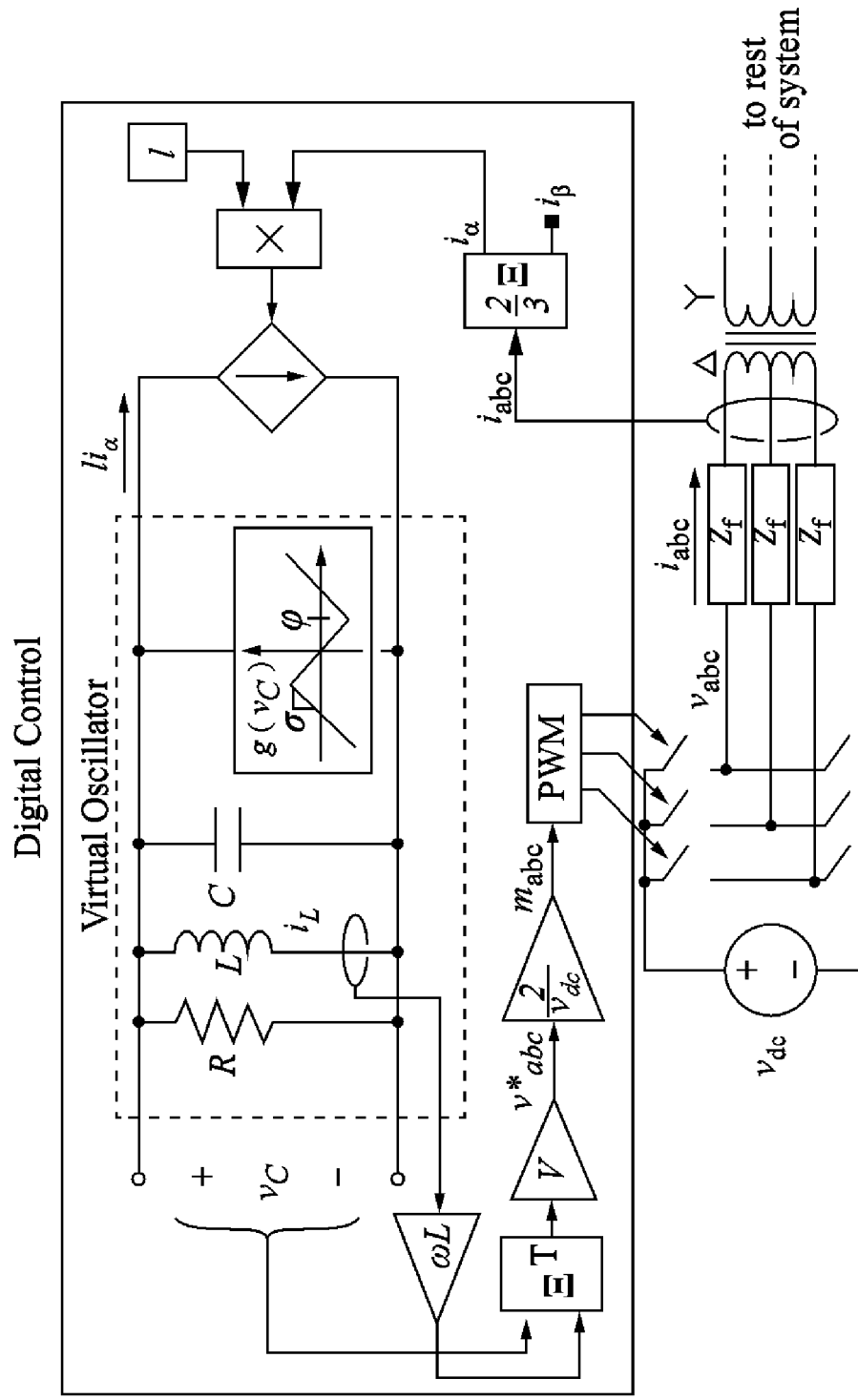
FIG. 37 is a circuit diagram of an exemplary inverter controller for three-phase signals.

FIG. 36 is a circuit diagram of an exemplary deadzone oscillator for three-phase signals and FIG. 37 is a circuit diagram of an exemplary inverter controller for three-phase signals with a pre-synchronization circuit. A matrix denoted with the Greek symbol for Xi (Ξ) converts back and forth between a set of three-phase waveforms and a pair of waveforms with a 90 degree phase shift. This allows an interface to the virtual oscillator, which has a naturally existing set of two waveforms with exhibit a 90 degree phase shift, to the external three-phase power system. The equations in FIGS. 34 and 35 describe the variable transformation and the graphs in FIGS. 34 and 35 illustrate what the variable transformation is doing.

Since the three-phase system can be recast as a single-phase equivalent, the design procedure given above can be applied identically to the three-phase inverter system.

The following is one implementation that can use the systems and methods discussed above. If a consumer has their own set of resources, they could utilize a system of power electronics inverters with virtual oscillator control to build a system with minimal design effort. The technology can be especially relevant to renewable energy systems, naval and military installations, and standalone installations in the developing world.

Enabling energy resources of this technology are photovoltaics, batteries, electric vehicles, and fuel-cells. In a microgrid-enabled future, consumers could generate and consume their own energy. Since energy is generated and consumed locally, there is a decreased dependence on the transmission infrastructure and it follows that transmission losses are decreased.

One potential use of virtual oscillator control involves electric vehicles. In such a setting, an electric vehicle can supply and consume energy from a residential microgrid.

Power electronics inverters convert direct current (DC), such as that produced by a car battery, into alternating current (AC), the kind of power supplied to your home and is used to power home appliances and electronics. Power electronics inverters utilize switching semiconductors and do not require electromechanical energy conversion.

To reduce switching harmonics, filters composed of inductors and capacitors are utilized such that a low-distortion sinusoidal current is delivered by an inverter. To improve waveform quality, there is an inherent cost tradeoff between power electronics switching frequency and filter component size. For instance, higher switching frequencies enable smaller and cheaper filters but may reduce efficiency.

System and methods are described for controlling a system of multiple inverters which are interconnected in a power system and are disconnected from the grid utility. The systems and methods of inverters can provide uninterruptible power to a set of AC loads. The loads can be residential, commercial, military, industrial, etc. in nature. The system and methods can control the inverters such that the inverters do not require any communication and only require measurements readily available at their AC output terminals. Inverters can automatically synchronize upon being added to and removed from the system. The systems and methods are generalized with respect to the number of inverters, N.

Benefits of the systems and methods include: i) communication is not required between inverters, ii) inverters can be added and removed from the system during operation, iii) the AC frequency and voltage is maintained within desired bounds iv) each inverter provides a fraction of power to the load in direct proportion to its power rating. Due to the absence of a communication network and system-level controller, the systems and methods do not contain a single point of failure. The inverters with the control systems and methods provide can reliable power to the set of loads on the on a network. The systems and methods provide a condition for inverter synchronization. If the synchronization condition, which depends on the control and inverter parameters, is satisfied, the system of inverters can be guaranteed to synchronize irrespective of the load type or number of inverters in the system.

The controller can be implemented on any digital platform such as a microcontroller, digital signal processor, field programmable gate array, etc. Alternatively, the virtual oscillator can also be constructed using an analog integrated circuit. The analog circuit can be configured to control the switching of power electronic semiconductor devices and to process a scaled current and voltage at an output of the power electronics inverter. The analog circuit can determine an oscillator voltage based on the current. The switches configured to be manipulated based on an analog oscillator voltage. An analog oscillator can be configured to determine the oscillator voltage The controller processes a set of measurements and generates an AC voltage command for the inverter hardware. Since no communication is required the systems and methods can enhance modularity and inverters can be seamlessly added to and removed from the network. Repairs can be made to the system of inverters and the system expanded without a need to reconfigure the system, e.g., the system of inverters can self-organize. The systems and methods are reliable and the control implementation is relatively simple to accomplish. The system and methods enable a bottom-up approach to systems design, e.g., that can be used by military installations, for uninterrupted power on power grids even during disturbances on the power grid, building installations, medical installations.

The systems, methods, devices, and logic described above may be implemented in many different ways in many different combinations of hardware, software or both hardware and software. For example, all or parts of the system may include circuitry in a controller, a microprocessor, or an application specified integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Many modifications and other embodiments set forth herein can come to mind based on the teachings presented in the foregoing descriptions and the associated drawings. Although specified terms are employed herein, they are used in a generic and descriptive sense only and not for purposes of limitation.

The invention claimed is:
1. A system, comprising:
an oscillator controller, the oscillator controller including a resistor, a capacitor, an inductor, and a piecewise linear voltage-dependent current source connected in parallel; and power electronics inverters connected with the oscillator controller in a network, the oscillator controller to generate an oscillating signal to modulate the power electronics inverters;

wherein the power electronics inverters utilize measurements at local terminals, without a need to exchange information between other power electronics inverters for synchronization.

2. The system of claim 1, wherein the power electronics inverters oscillate as a synchronized alternating current system.

3. The system of claim 1, wherein voltage limits are respected across a no-load to a maximum rated load range.

4. The system of claim 1, wherein a distortion of a sinusoidal output of the power electronics inverters is reduced.

5. The system of claim 1, wherein the power electronics inverters automatically synchronize ac outputs across the network.

6. The system of claim 5, wherein the synchronization occurs automatically upon adding or removing a power electronics inverter to the network.

7. The system of claim 5, wherein the synchronization occurs without a phase lock loop to generate sinusoidal reference waveforms or explicit communication between power electronics inverters.

8. The system of claim 5, wherein the synchronization occurs without a proportional-integral or proportional-integral-derivate controller.

9. The system of claim 5, wherein the synchronization is agnostic to a number of power electronics inverters and loads.

10. The system of claim 1, wherein the power electronics inverters further include the oscillator controller implemented as code stored in memory and executed by a processor or as an analog integrated circuit.

11. The system of claim 1, wherein the power electronics inverters share a load proportional to their size.

12. The system of claim 1, wherein real and reactive power need not be calculated in real time.

13. The system of claim 1, wherein the power electronics inverters further include a pre-synchronization circuit to synchronize the other power electronics inverters before adding them to an energized network.

14. A system, comprising:
a power electronics inverter including switching semiconductor devices and passive filtering components;
at least one of a microcontroller to control the switching semiconductor devices, the microcontroller configured to digitize the current and voltage at an output of the power electronics inverter and determine an oscillator voltage based on the current, the switching semiconductor devices being manipulated based on the oscillator voltage, or an analog circuit configured to control the switching semiconductor devices, the analog circuit configured to process a scaled current and voltage at the output of the power electronics inverter and determine an oscillator voltage based on the current, the switching semiconductor devices configured to be manipulated based on the analog oscillator voltage; and
an oscillator controller of the microcontroller, the oscillator controller including a resistor, a capacitor, an inductor, and a piecewise linear voltage-dependent current source connected in parallel, wherein the oscillator controller is configured to determine the oscillator voltage.

15. The system of claim 14, wherein the switching semiconductor devices are interleaved to reduce operating ripple.

16. The system of claim 14, wherein the oscillator controller comprises an analog oscillator to determine the oscillator voltage.

17. The system of claim 14, wherein the microprocessor or analog circuit further includes a pulse width modulator to send a signal to the power electronics switching semiconductor devices to control the switching based on the oscillator voltage.

18. A method, comprising:
an oscillator controller including a resistor, a capacitor, an inductor, and a piecewise linear voltage-dependent current source connected in parallel, an analog to digital converter and accompanying analog circuitry for determining an output current of a power electronics inverter, for:
determining an instantaneous oscillation voltage based on the current; and
controlling switching of the power electronics circuit based on the instantaneous oscillation voltage.

19. The method of claim 18, wherein the analog circuitry comprises an integrated circuit for determining the output current of the power electronics inverter.

20. The method of claim 18, further comprising inputting a scaled current into the oscillator controller to determine the oscillation voltage.

* * * * *